US008149431B2

(12) United States Patent
Barton et al.

(10) Patent No.: US 8,149,431 B2
(45) Date of Patent: Apr. 3, 2012

(54) SYSTEMS AND METHODS FOR MANAGING PRINTER SETTINGS IN A NETWORKED COMPUTING ENVIRONMENT

(75) Inventors: Gary Lee Barton, Boca Roca, FL (US); Ricardo Fernando Feijoo, Davie, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 744 days.

(21) Appl. No.: 12/267,274

(22) Filed: Nov. 7, 2008

(65) Prior Publication Data
US 2010/0118330 A1    May 13, 2010

(51) Int. Cl.
*H04N 1/04* (2006.01)
(52) U.S. Cl. ......... 358/1.13; 358/1.15; 358/1.1; 358/1.9
(58) Field of Classification Search .................. 358/1.13, 358/1.15, 1.18, 1.9
See application file for complete search history.

(56) References Cited

U.S. PATENT DOCUMENTS

| | | | |
|---|---|---|---|
| 4,210,910 A | 7/1980 | Wohlers | |
| 4,941,089 A | 7/1990 | Fischer | |
| 5,280,627 A | 1/1994 | Flaherty et al. | |
| 5,315,711 A | 5/1994 | Barone et al. | |
| 5,329,619 A | 7/1994 | Page et al. | |
| 5,404,527 A | 4/1995 | Irwin et al. | |
| 5,442,771 A | 8/1995 | Filepp et al. | |
| 5,689,708 A | 11/1997 | Regnier et al. | |
| 5,745,759 A | 4/1998 | Hayden et al. | |
| 5,812,784 A | 9/1998 | Watson et al. | |
| 5,819,093 A | 10/1998 | Davidson et al. | |
| 5,822,436 A | 10/1998 | Rhoads | |
| 5,826,027 A | 10/1998 | Pedersen et al. | |
| 5,828,840 A * | 10/1998 | Cowan et al. | ................. 709/203 |
| 5,832,119 A | 11/1998 | Rhoads | |
| 5,841,978 A | 11/1998 | Rhoads | |
| 5,862,260 A | 1/1999 | Rhoads | |
| 5,877,766 A | 3/1999 | Bates et al. | |
| 5,909,559 A | 6/1999 | So | |
| 5,911,044 A | 6/1999 | Lo et al. | |
| 5,930,804 A | 7/1999 | Yu et al. | |
| 5,977,972 A | 11/1999 | Bates et al. | |
| 5,987,611 A | 11/1999 | Freund | |
| 6,016,535 A | 1/2000 | Krantz et al. | |
| 6,022,315 A | 2/2000 | Iliff | |
| 6,052,120 A | 4/2000 | Nahi et al. | |

(Continued)

OTHER PUBLICATIONS

International Search Report for PCT/US09/56780.

(Continued)

*Primary Examiner* — Houshang Safaipour
(74) *Attorney, Agent, or Firm* — Foley & Lardner LLP; John D. Lanza

(57) ABSTRACT

Systems and methods for remotely managing printer settings that are associated with a remote printer connected to a client machine. A virtual printer driver, executing on a server, is used to generate and manage generate virtual printer queues associated with remote printers connected to the client machine. Each virtual printer queue intercepts print requests generated by one or more applications executing on the server, these print requests cause the virtual printer driver to either retrieve printer setting information from cache memory, or interrogate the remote printer for printer setting information. The virtual printer driver retrieves printer setting information and associates virtual printer queues with remote printers using the retrieved printer setting information. The virtual printer driver then responds to the print request by generating a graphical interface that incorporates the retrieved printer settings and user-defined printer settings.

26 Claims, 12 Drawing Sheets

U.S. PATENT DOCUMENTS

| | | |
|---|---|---|
| 6,072,490 A | 6/2000 | Bates et al. |
| 6,081,623 A | 6/2000 | Bloomfield et al. |
| 6,084,584 A | 7/2000 | Nahi et al. |
| 6,108,712 A * | 8/2000 | Hayes, Jr. .................. 709/246 |
| 6,111,954 A | 8/2000 | Rhoads |
| 6,122,403 A | 9/2000 | Rhoads |
| 6,141,699 A | 10/2000 | Luzzi et al. |
| 6,166,734 A | 12/2000 | Nahi et al. |
| 6,198,920 B1 | 3/2001 | Doviak et al. |
| 6,199,181 B1 | 3/2001 | Rechef et al. |
| 6,206,829 B1 | 3/2001 | Iliff |
| 6,209,088 B1 | 3/2001 | Reneris |
| 6,249,765 B1 | 6/2001 | Adler et al. |
| 6,268,853 B1 | 7/2001 | Hoskins et al. |
| 6,272,556 B1 | 8/2001 | Gish |
| 6,286,036 B1 | 9/2001 | Rhoads |
| 6,289,382 B1 | 9/2001 | Bowman-Amuah |
| 6,292,827 B1 | 9/2001 | Raz |
| 6,300,947 B1 | 10/2001 | Kanevsky |
| 6,314,406 B1 | 11/2001 | O'Hagan et al. |
| 6,320,934 B1 | 11/2001 | Carroll et al. |
| 6,324,573 B1 | 11/2001 | Rhoads |
| 6,332,163 B1 | 12/2001 | Bowman-Amuah |
| 6,334,664 B1 | 1/2002 | Silverbrook et al. |
| 6,339,832 B1 | 1/2002 | Bowman-Amuah |
| 6,342,901 B1 | 1/2002 | Adler et al. |
| 6,381,341 B1 | 4/2002 | Rhoads |
| 6,398,359 B1 | 6/2002 | Silverbrook et al. |
| 6,400,996 B1 | 6/2002 | Hoffberg et al. |
| 6,404,446 B1 | 6/2002 | Bates et al. |
| 6,408,331 B1 | 6/2002 | Rhoads |
| 6,418,324 B1 | 7/2002 | Doviak et al. |
| 6,431,777 B1 | 8/2002 | Silverbrook et al. |
| 6,434,568 B1 | 8/2002 | Bowman-Amuah |
| 6,434,628 B1 | 8/2002 | Bowman-Amuah |
| 6,438,231 B1 | 8/2002 | Rhoads |
| 6,438,594 B1 | 8/2002 | Bowman-Amuah |
| 6,442,549 B1 | 8/2002 | Schneider |
| 6,442,748 B1 | 8/2002 | Bowman-Amuah |
| 6,447,113 B1 | 9/2002 | Silverbrook et al. |
| 6,452,923 B1 | 9/2002 | Gerszberg et al. |
| 6,459,425 B1 | 10/2002 | Holub et al. |
| 6,477,580 B1 | 11/2002 | Bowman-Amuah |
| 6,477,665 B1 | 11/2002 | Bowman-Amuah |
| 6,482,156 B2 | 11/2002 | Iliff |
| 6,496,850 B1 | 12/2002 | Bowman-Amuah |
| 6,502,213 B1 | 12/2002 | Bowman-Amuah |
| 6,529,909 B1 | 3/2003 | Bowman-Amuah |
| 6,529,948 B1 | 3/2003 | Bowman-Amuah |
| 6,539,336 B1 | 3/2003 | Vock et al. |
| 6,539,396 B1 | 3/2003 | Bowman-Amuah |
| 6,549,949 B1 | 4/2003 | Bowman-Amuah |
| 6,550,057 B1 | 4/2003 | Bowman-Amuah |
| 6,553,129 B1 | 4/2003 | Rhoads |
| 6,556,950 B1 | 4/2003 | Schwenke et al. |
| 6,567,533 B1 | 5/2003 | Rhoads |
| 6,570,587 B1 | 5/2003 | Efrat et al. |
| 6,571,282 B1 | 5/2003 | Bowman-Amuah |
| 6,571,285 B1 | 5/2003 | Groath et al. |
| 6,578,068 B1 | 6/2003 | Bowman-Amuah |
| 6,580,808 B2 | 6/2003 | Rhoads |
| 6,590,998 B2 | 7/2003 | Rhoads |
| 6,595,417 B2 | 7/2003 | O'Hagan et al. |
| 6,598,087 B1 | 7/2003 | Dixon et al. |
| 6,601,087 B1 | 7/2003 | Zhu et al. |
| 6,601,192 B1 | 7/2003 | Bowman-Amuah |
| 6,601,234 B1 | 7/2003 | Bowman-Amuah |
| 6,606,660 B1 | 8/2003 | Bowman-Amuah |
| 6,606,744 B1 | 8/2003 | Mikurak |
| 6,615,199 B1 | 9/2003 | Bowman-Amuah |
| 6,615,253 B1 | 9/2003 | Bowman-Amuah |
| 6,629,081 B1 | 9/2003 | Cornelius et al. |
| 6,631,986 B2 | 10/2003 | Silverbrook et al. |
| 6,636,242 B2 | 10/2003 | Bowman-Amuah |
| 6,640,145 B2 | 10/2003 | Hoffberg et al. |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,647,128 B1 | 11/2003 | Rhoads |
| 6,647,130 B2 | 11/2003 | Rhoads |
| 6,652,089 B2 | 11/2003 | Silverbrook et al. |
| 6,652,090 B2 | 11/2003 | Silverbrook et al. |
| 6,654,032 B1 | 11/2003 | Zhu et al. |
| 6,668,253 B1 | 12/2003 | Thompson et al. |
| 6,671,818 B1 | 12/2003 | Mikurak |
| 6,678,864 B1 | 1/2004 | Tsai |
| 6,681,029 B1 | 1/2004 | Rhoads |
| 6,687,874 B2 | 2/2004 | Burgess |
| 6,691,301 B2 | 2/2004 | Bowen et al. |
| 6,700,990 B1 | 3/2004 | Rhoads |
| 6,704,117 B1 | 3/2004 | Chintakrindi et al. |
| 6,715,145 B1 | 3/2004 | Bowman-Amuah |
| 6,735,601 B1 | 5/2004 | Subrahmanyam |
| 6,742,015 B1 | 5/2004 | Bowman-Amuah |
| 6,751,320 B2 | 6/2004 | Rhoads |
| 6,760,463 B2 | 7/2004 | Rhoads |
| 6,760,748 B1 | 7/2004 | Hakim |
| 6,775,392 B1 | 8/2004 | Rhoads |
| 6,813,366 B1 | 11/2004 | Rhoads |
| 6,820,974 B2 | 11/2004 | Silverbrook et al. |
| 6,842,906 B1 | 1/2005 | Bowman-Amuah |
| 6,849,045 B2 | 2/2005 | Iliff |
| 6,850,252 B1 | 2/2005 | Hoffberg |
| 6,850,943 B2 | 2/2005 | Teixeira et al. |
| 6,853,391 B2 | 2/2005 | Bates et al. |
| 6,862,553 B2 | 3/2005 | Schwenke et al. |
| 6,871,346 B1 | 3/2005 | Kumbalimutt et al. |
| 6,873,988 B2 | 3/2005 | Herrmann et al. |
| 6,879,701 B1 | 4/2005 | Rhoads |
| 6,899,420 B2 | 5/2005 | Silverbrook et al. |
| 6,918,665 B2 | 7/2005 | Silverbrook et al. |
| 6,935,736 B2 | 8/2005 | Silverbrook et al. |
| 6,938,051 B1 | 8/2005 | Burger et al. |
| 6,943,905 B2 | 9/2005 | Ferlitsch |
| 6,968,057 B2 | 11/2005 | Rhoads |
| 6,980,962 B1 | 12/2005 | Arganbright et al. |
| 6,985,901 B1 | 1/2006 | Sachse et al. |
| 6,993,456 B2 | 1/2006 | Brooks et al. |
| 6,996,628 B2 | 2/2006 | Keane et al. |
| 7,000,012 B2 | 2/2006 | Moore et al. |
| 7,006,881 B1 | 2/2006 | Hoffberg et al. |
| 7,016,055 B2 | 3/2006 | Dodge et al. |
| 7,020,635 B2 | 3/2006 | Hamilton et al. |
| 7,028,333 B2 | 4/2006 | Tuomenoksa et al. |
| 7,028,334 B2 | 4/2006 | Tuomenoksa |
| 7,030,890 B1 | 4/2006 | Jouet et al. |
| 7,032,030 B1 | 4/2006 | Codignotto |
| 7,035,427 B2 | 4/2006 | Rhoads |
| 7,042,879 B2 | 5/2006 | Eschbach et al. |
| 7,047,424 B2 | 5/2006 | Bendinelli et al. |
| 7,054,465 B2 | 5/2006 | Rhoads |
| 7,055,947 B2 | 6/2006 | Silverbrook et al. |
| 7,057,759 B2 | 6/2006 | Lapstun et al. |
| 7,058,697 B2 | 6/2006 | Rhoads |
| 7,069,234 B1 | 6/2006 | Cornelius et al. |
| 7,070,110 B2 | 7/2006 | Lapstun et al. |
| 7,072,807 B2 | 7/2006 | Brown et al. |
| 7,075,643 B2 | 7/2006 | Holub |
| 7,085,854 B2 | 8/2006 | Keane et al. |
| 7,086,728 B2 | 8/2006 | Silverbrook et al. |
| 7,089,487 B2 | 8/2006 | Tsai |
| 7,092,370 B2 | 8/2006 | Jiang et al. |
| 7,096,495 B1 | 8/2006 | Warrier et al. |
| 7,097,106 B2 | 8/2006 | Silverbrook et al. |
| 7,103,197 B2 | 9/2006 | Rhoads |
| 7,113,596 B2 | 9/2006 | Rhoads |
| 7,113,614 B2 | 9/2006 | Rhoads |
| 7,116,781 B2 | 10/2006 | Rhoads |
| 7,124,098 B2 | 10/2006 | Hopson et al. |
| 7,124,101 B1 | 10/2006 | Mikurak |
| 7,128,265 B2 | 10/2006 | Silverbrook et al. |
| 7,128,270 B2 | 10/2006 | Silverbrook et al. |
| 7,130,807 B1 | 10/2006 | Mikurak |
| 7,131,596 B2 | 11/2006 | Lapstun et al. |
| 7,137,566 B2 | 11/2006 | Silverbrook et al. |
| 7,144,095 B2 | 12/2006 | Silverbrook et al. |
| 7,150,398 B2 | 12/2006 | Silverbrook et al. |

| Patent/Publication | Date | Name |
|---|---|---|
| 7,154,638 B1 | 12/2006 | Lapstun et al. |
| 7,159,777 B2 | 1/2007 | Silverbrook et al. |
| 7,162,509 B2 | 1/2007 | Brown et al. |
| 7,167,260 B2 | 1/2007 | Iwata et al. |
| 7,167,844 B1 | 1/2007 | Leong et al. |
| 7,171,016 B1 | 1/2007 | Rhoads |
| 7,175,089 B2 | 2/2007 | Silverbrook et al. |
| 7,178,719 B2 | 2/2007 | Silverbrook et al. |
| 7,181,766 B2 | 2/2007 | Bendinelli et al. |
| 7,187,470 B2 | 3/2007 | Lapstun et al. |
| 7,188,138 B1 | 3/2007 | Schneider |
| 7,188,769 B2 | 3/2007 | Silverbrook et al. |
| 7,194,552 B1 | 3/2007 | Schneider |
| 7,197,374 B2 | 3/2007 | Silverbrook et al. |
| 7,199,885 B2 | 4/2007 | Dodge et al. |
| 7,200,530 B2 | 4/2007 | Brown et al. |
| 7,207,483 B2 | 4/2007 | Silverbrook et al. |
| 7,207,485 B2 | 4/2007 | Silverbrook et al. |
| 7,212,296 B2 | 5/2007 | Dodge et al. |
| 7,340,772 B2 | 3/2008 | Panasyuk et al. |
| 2002/0023210 A1 | 2/2002 | Tuomenoksa et al. |
| 2002/0035451 A1 | 3/2002 | Rothermel |
| 2002/0114004 A1 | 8/2002 | Ferlitsch |
| 2002/0141418 A1 | 10/2002 | Ben-Dor et al. |
| 2003/0084165 A1 | 5/2003 | Kjellberg et al. |
| 2003/0131263 A1 | 7/2003 | Keane et al. |
| 2003/0177389 A1 | 9/2003 | Albert et al. |
| 2004/0107360 A1 | 6/2004 | Herrmann et al. |
| 2004/0190092 A1 | 9/2004 | Silverbrook et al. |
| 2005/0091214 A1 | 4/2005 | Probert et al. |
| 2005/0091302 A1 | 4/2005 | Soin et al. |
| 2005/0091535 A1 | 4/2005 | Kavalam et al. |
| 2005/0091658 A1 | 4/2005 | Kavalam et al. |
| 2005/0144186 A1 | 6/2005 | Hesselink et al. |
| 2005/0149481 A1 | 7/2005 | Hesselink et al. |
| 2005/0149726 A1 | 7/2005 | Joshi et al. |
| 2005/0246445 A1 | 11/2005 | Panasyuk et al. |
| 2005/0265351 A1 | 12/2005 | Smith et al. |
| 2006/0107269 A1 | 5/2006 | Bantz et al. |
| 2007/0008567 A1 | 1/2007 | Choi |
| 2007/0103726 A1 | 5/2007 | Iwata et al. |
| 2007/0179955 A1 | 8/2007 | Croft et al. |
| 2007/0198656 A1* | 8/2007 | Mazzaferri et al. ........... 709/218 |

OTHER PUBLICATIONS

Written Opinion for PCT/US09/56780.

* cited by examiner

SYSTEMS AND METHODS FOR MANAGING PRINTER SETTINGS IN A NETWORKED COMPUTING ENVIRONMENT

FIELD OF THE DISCLOSURE

This application relates generally to printing. In particular, this application relates to systems and methods for managing printer settings in a networked computing environment.

BACKGROUND

Solutions employed to accomplish printing in a remote access environment include those that generalize the printer settings associated with a printer connected to a client computer, or by providing generic printer settings in lieu of user specified print settings. Other solutions utilize a database of printer drivers to generate the print window and to format the print file. Still other solutions may use a generic printer driver to create a print window and print file.

SUMMARY

In one aspect, a method for managing printer settings in a networked computing environment includes executing, by a first machine in a networked computing environment, an application. The method includes intercepting, by a virtual printer queue managed by a virtual printer driver, a first print request generated via the application by a second machine in the networked computing environment. The method includes retrieving, by the virtual printer driver and in response to the interception of the first print request, setting information associated with a first remote printer, the first remote printer in communication with the second machine. The method includes displaying, by the virtual printer driver, a first graphical interface associated with the first remote printer, the first graphical interface dynamically generated by the virtual printer driver in response to retrieving the setting information. The method includes intercepting, by the virtual printer queue, a second print request generated via the application by a third machine in the networked computing environment. The method includes retrieving, by the virtual printer driver and in response to the interception of the second print request, setting information associated with a second remote printer, the second remote printer in communication with the third machine. The method includes displaying, by the virtual printer driver, a second graphical interface associated with the second remote printer, the second graphical interface dynamically generated by the virtual printer driver in response to retrieving the setting information associated with the second remote printer.

The method may include detecting, by the virtual printer driver, a change in at least one printer setting associated with the first remote printer. This method can include updating, by the virtual printer driver, the first graphical interface to display the changed printer setting. This method can include displaying, by the virtual printer driver, the updated first graphical interface. This method can include associating, by the virtual printer driver, the virtual printer queue with the first remote printer This method can include intercepting, by the virtual printer queue, a third print request generated via the application by the second machine. Further, this method can include displaying, by the virtual printer driver, the first graphical interface associated with the first remote printer, the first graphical interface displayed by the virtual printer driver responsive to the interception of the third print request. This method can include transmitting, by the virtual printer driver, the retrieved setting information associated with the first remote printer to a graphics rendering engine on the second machine.

The method may include executing the virtual printer driver on a host machine in the networked computing environment. This method can include creating, by the virtual printer driver, the virtual printer queue according to retrieved printer setting information This method can include using retrieved printer setting information to identify, by the virtual printer driver, a plurality of remote printers associated with a client machine in the networked computing environment. This method can include associating, by the virtual printer driver, the virtual printer queue with the remote printer connected to the client machine. In associating the first remote printer with the virtual printer queue, the method can include mapping, by the virtual printer driver, a path to the first remote printer. This method can include interrogating, by the virtual printer driver, the first remote printer connected to the second machine.

The method may include retrieving, by the virtual printer driver, printer setting information associated with the first remote printer, the printer setting information generated during interrogation of the first remote printer. This method can include creating, by the virtual printer driver, a first virtual printer queue associated with the first remote printer. This method can include displaying, by the virtual printer driver, a first graphical interface associated with the first remote printer, the first graphical interface including the retrieved printer setting information associated with the first remote printer. This method can include transmitting, by the virtual printer driver, the retrieved setting information associated with the first remote printer to the graphics rendering engine on the second machine.

In another aspect, a method for managing printer settings in a networked computing environment, the method includes executing, by a first machine in a networked computing environment, an application. The method includes intercepting, by a virtual printer queue managed by a virtual printer driver, a first print request generated via the application by a second machine in the networked computing environment. The method includes retrieving, by the virtual printer driver and in response to the interception of the first print request, setting information associated with a first remote printer, the first remote printer in communication with the second machine. The method includes displaying, by the virtual printer driver, a first graphical interface associated with the first remote printer, the first graphical interface dynamically generated by the virtual printer driver in response to retrieving the setting information. The method includes intercepting, by the virtual printer driver, an event disrupting access to the application from the second machine. The method includes retrieving, by the virtual printer driver, printer setting information associated with the first remote printer. The method includes displaying, by the virtual printer driver, the first graphical interface associated with the first remote printer, the first graphical interface displayed by the virtual printer driver responsive to the retrieval of the setting information associated with the first remote printer.

The method may include intercepting a connection timeout between the second machine and the application. This method can include intercepting a network disruption between the second machine and the application. This method may include intercepting a user request to disconnect and reconnect the second machine to the application. Further, this method can include intercepting a second print request generated via the application by a third machine in the networked computing environment followed by a third print request generated via the application by the second machine.

In yet another aspect, a system for managing printer settings in a networked computing environment includes a first machine, in a networked computing environment, executing an application. The system includes a virtual printer queue, executing on the first machine, for intercepting a first print request generated via the application by a second machine, and intercepting a second print request generated via the application by a third machine. The system includes a virtual printer driver, executing on the first machine, for managing the virtual printer queue. Further, the virtual printer driver retrieves from a first remote printer, connected to the second machine, setting information associated with the first remote printer, responsive to the interception of the first print request by the virtual printer queue. The virtual printer driver dynamically generates a first graphical interface associated with the first remote printer, responsive to the retrieved setting information associated with the first remote printer. The virtual printer driver displays the first graphical interface associated with the first remote printer. The virtual printer driver retrieves from a second remote printer, connected to the third machine, setting information associated with the second remote printer, responsive to the interception of the second print request by the virtual printer queue. The virtual printer driver dynamically generates a second graphical interface associated with the second remote printer, responsive to the retrieved setting information associated with the second remote printer. The virtual printer driver displays the second graphical interface associated with the second remote printer.

The virtual printer driver can detect a change in at least one printer setting associated with the first remote printer. The virtual printer driver can update the first graphical interface associated with the first remote printer to display the changed printer setting. The virtual printer driver may display the updated first graphical interface associated with the first remote printer. Further, the virtual printer driver can associate the virtual printer queue with the first remote printer. The virtual printer driver can display the first graphical interface associated with the first remote printer, the first graphical interface displayed in response to the interception of a third print request by the virtual printer queue, the third print request generated via the application by the first machine. The virtual printer driver can transmit the retrieved setting information associated with the first remote printer to a graphics rendering engine on the first machine.

The virtual printer may create the virtual printer queue according to retrieved printer setting information associated with the first remote printer. The virtual printer can identify a plurality of remote printers associated with a client computing device, based at least in part on the retrieved printer setting information associated with the first remote printer. The virtual printer may associate the virtual printer queue with the remote printer connected to the client computing device. Further, the virtual printer driver for associating the first remote printer with the virtual printer queue can maps a path from the virtual printer queue to the first remote printer.

The virtual printer driver may interrogate the first remote printer connected to the second machine. The virtual printer driver can retrieve printer setting information associated with the first remote printer, the printer setting information generated during interrogation of the first remote printer. The virtual printer driver can create a first virtual printer queue associated with the first remote printer. Further, the virtual printer driver can display a first graphical interface associated with the first remote printer, the first graphical interface including the retrieved printer setting information. The virtual printer driver may transmit the retrieved setting information associated with the first remote printer to the graphics rendering engine on the second machine.

Still another aspect shown, and described below, includes a computer readable medium having instructions thereon, that when executed provide a method for managing printer settings in a networked computing environment, the computer readable medium. Included in the computer readable medium are instructions to execute a virtual printer driver, the virtual printer driver configured in part to manage virtual printer queues. The computer readable medium includes instructions to intercept, by a virtual printer queue, a first print request generated, via an application executing on a first machine in a networked computing environment, by a second machine. The computer readable medium includes instructions to retrieve, by the virtual printer driver, from a first remote printer, setting information associated with the first remote printer, responsive to the interception of the first print request. Further, the computer readable medium includes instructions to display, by the virtual printer driver, a first graphical interface associated with the first remote printer, the first graphical interface dynamically generated by the virtual printer driver in response to the retrieved setting information. The computer readable medium includes instructions to intercept, by the virtual printer queue, a second print request generated via the application by a third machine. The computer readable medium includes instructions to retrieve, by the virtual printer driver, from a second remote printer, setting information associated with the second remote printer, in response to the interception of the second print request. The computer readable medium includes instructions to display, by the virtual printer driver, a second graphical interface associated with the second remote printer, the second graphical interface dynamically generated by the virtual printer driver in response to the retrieved setting information associated with the second remote printer.

The computer readable medium may include instructions to detect, by the virtual printer driver, a change in at least one printer setting associated with the first remote printer. The computer readable medium can include instructions to update, by the virtual printer driver, the first graphical interface to display the changed printer setting. The computer readable medium can include instructions to display, by the virtual printer driver, the updated first graphical interface. The computer readable medium may include instructions to associate the virtual printer queue with the first remote printer. The computer readable medium may include instructions to intercept, by the virtual printer queue, a third print request generated via the application by the second machine. Further, the computer readable medium may include instructions to display, by the virtual printer driver, the first graphical interface associated with the first remote printer queue, the first graphical interface displayed by the virtual printer driver responsive to the interception of the third print request. The computer readable medium may include instructions to transmit, by the virtual printer driver, the retrieved setting information associated with the first remote printer to a graphics rendering engine on the second machine.

The computer readable medium may include instructions to execute the virtual printer driver on a host machine in the networked computing environment. The computer readable medium can include instructions to create the virtual printer queue, by the virtual printer driver, according to the retrieved printer setting information associated with the first remote printer. The computer readable medium may include instructions to use the retrieved printer setting information associated with the first remote printer to identify, by the virtual printer driver, a plurality of remote printers associated with a client machine. Further, the computer readable medium may include instructions to associate the virtual printer queue, by the virtual printer driver, with the first remote printer connected to the client machine. The instructions to associate the first remote printer with the virtual printer queue can include instructions to map, by the virtual printer driver, a path to the first remote printer.

The computer readable medium may include instructions to interrogate, by the virtual printer driver, the first remote printer connected to the second machine. The computer readable medium may include instructions to retrieve, by the virtual printer driver, printer setting information associated with the first remote printer, the printer setting information generated during interrogation of the first remote printer. The computer readable medium may include instructions to create, by the virtual printer driver, a first virtual printer queue associated with the first remote printer. Further, the computer readable medium may include instructions to display, by the virtual printer driver, a first graphical interface associated with the first remote printer, the first graphical interface including the retrieved printer setting information associated with the first remote printer. The computer readable medium may include instructions to transmit, by the virtual printer driver, the retrieved setting information associated with the first remote printer to a graphics rendering engine on the second machine.

BRIEF DESCRIPTION OF THE DRAWINGS

The following figures depict illustrative embodiments of the methods and systems described herein. These figures are intended to illustrate and not limit the method and system described herein.

DETAILED DESCRIPTION

Figure 1A:
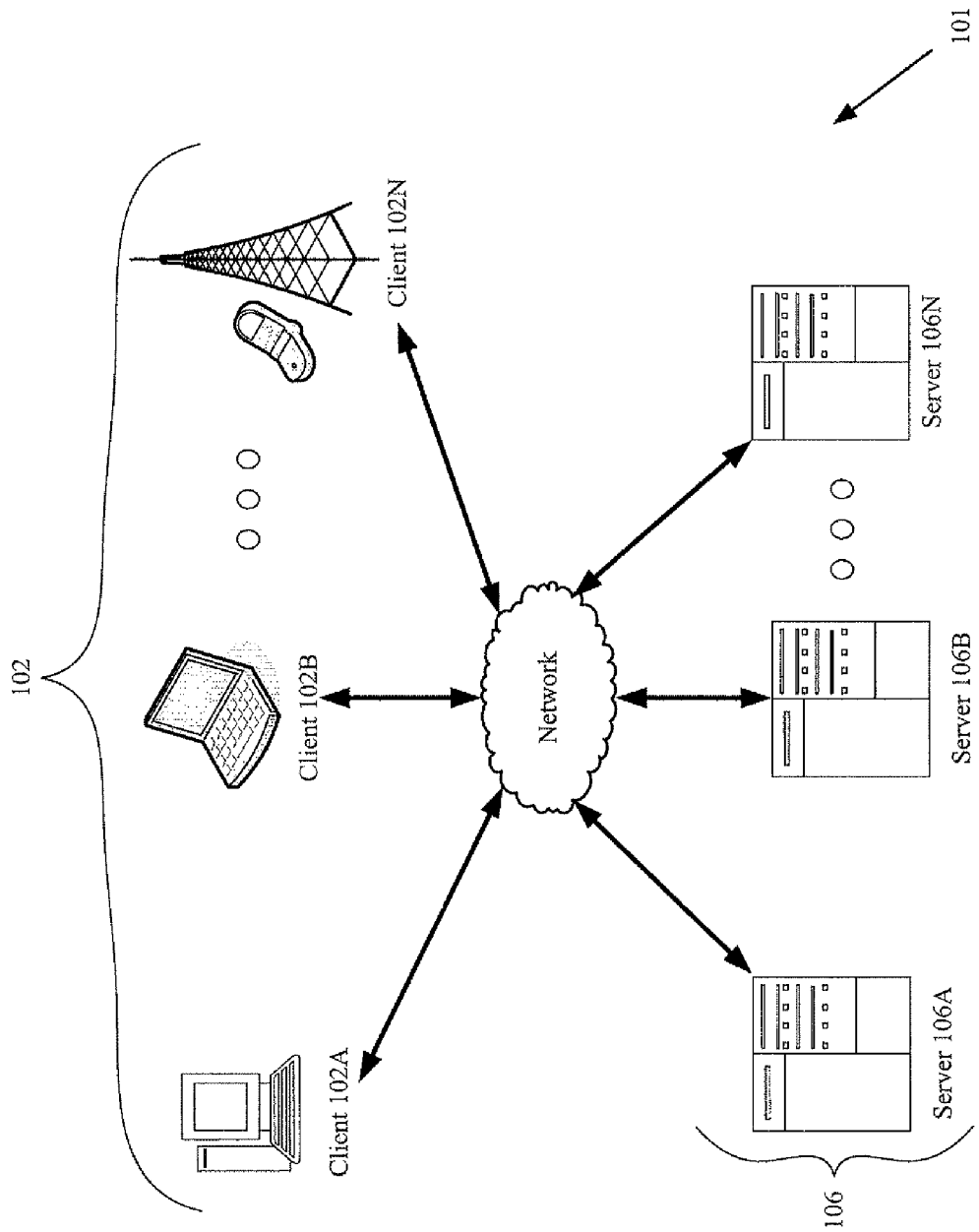
FIG. 1A is a block diagram that illustrates an embodiment of a networked computing environment with a client machine that communicates with a server.

FIG. 1A illustrates one embodiment of a computing environment 101 that includes one or more client machines 102A-102N in communication with servers 106A-106N, and a network 104 installed in between the client machines 102A-102N and the servers 106A-106N. In another embodiment, the computing environment 101 can be a networked computing environment. In some embodiments, client machines 102A-10N may be referred to as a single client machine 102 or a single group of client machines 102, while servers may be referred to as a single server 106 or a single group of servers 106. One embodiment includes a single client machine 102 communicating with more than one server 106, another embodiment includes a single server 106 communicating with more than one client machine 102, while another embodiment includes a single client machine 102 communicating with a single server 106.

A client machine 102 within the computing environment may in some embodiments, be referenced by any one of the following terms: client machine(s) 102; client(s); client computer(s); client device(s); client computing device(s); client node(s); endpoint(s); endpoint node(s); or a second machine. The server 106 in some embodiments may be referenced by any one of the following terms: server(s), server farm(s), host computing device(s), or a first machine(s).

The client machine 102 can in some embodiments execute, operate or otherwise provide an application that can be any one of the following: software; a program; executable instructions; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other type and/or form of executable instructions capable of executing on client machine 102. Still other embodiments may include a computing environment 101 with an application that is any of either server-based or remote-based, and an application that is executed on the server 106 on behalf of the client machine 102. Further embodiments of the computing environment 101 include a server 106 configured to display output graphical data to a client machine 102 using a thin-client or remote-display protocol, where the protocol used can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can, in some embodiments, include more than one server 106A-106N where the servers 106A-106N are: grouped together as a single server 106 entity, logically-grouped together in a server farm 106; geographically dispersed and logically grouped together in a server farm 106, located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity or in other embodiments may include multiple server farms 106. The computing environment 101 can include more than one server 106A-106N grouped together in a single server farm 106 where the server farm 106 is heterogeneous such that one server 106A-106N is configured to operate according to a first type of operating system platform (e.g., WINDOWS NT, manufactured by Microsoft Corp. of Redmond, Wash.), while one or more other servers 106A-106N are configured to operate according to a second type of operating system platform (e.g., Unix or Linux); more than one server 106A-106N is configured to operate according to a first type of operating system platform (e.g., WINDOWS NT), while another server 106A-106N is configured to operate according to a second type of operating system platform (e.g., Unix or Linux); or more than one server 106A-106N is configured to operate according to a first type of operating system platform (e.g., WINDOWS NT) while more than one of the other servers 106A-106N are configured to operate according to a second type of operating system platform (e.g., Unix or Linux).

The computing environment 101 can in some embodiments include a server 106 or more than one server 106 configured to provide the functionality of any one of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 configured to operate as an active direction; a server 106 configured to operate as application acceleration application that provides firewall functionality, application functionality, or load balancing functionality, or other type of computing machine configured to operate as a server 106. In some embodiments, a server 106 may include a remote authentication dial-in user service such that the server 106 is a RADIUS server. Embodiments of the computing environment 101 where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a server 106 with the following functionality: a first server 106A that receives requests from a client machine 102, forwards the request to a second server 106B, and responds to the request generated by the client machine with a response from the second server 106B; acquires an enumeration of applications available to the client machines 102 and address information associated with a server 106 hosting an application identified by the enumeration of applications; presents responses to client requests using a web interface; communicates directly with the client 102 to provide the client 102 with access to an identified application; receives output data, such as display data, generated by an execution of an identified application on the server 106.

The server 106 can be configured to execute any one of the following applications: an application providing a thin-client computing or a remote display presentation application; any portion of the CITRIX ACCESS SUITE by Citrix Systems, Inc. like the METAFRAME, CITRIX PRESENTATION SERVER, CITRIX XENAPP, CITRIX XEN DESKTOP and/ or any of the MICROSOFT WINDOWS Terminal Services manufactured by the Microsoft Corporation; or an ICA client, developed by Citrix Systems, Inc. Another embodiment includes a server 106 configured to execute an application so that the server may function as an application server such as any one of the following application server types: an email server that provides email services such as MICROSOFT EXCHANGE manufactured by the Microsoft Corporation; a web or Internet server; a desktop sharing server; or a collaboration server. Still other embodiments include a server 106 that executes an application that is any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 may function, in some embodiments, as a client node seeking access to resources provided by a server 106, or as a server 106 providing other clients 102A-102N with access to hosted resources. One embodiment of the computing environment 101 includes a server 106 that provides the functionality of a master node. Communication between the client machine 102 and either a server 106 or servers 106A-106N can be established via any of the following methods: direct communication between a client machine 102 and a server 106A-106N in a server farm 106; a client machine 102 that uses a program neighborhood application to communicate with a server 106A-106N in a server farm 106; or a client machine 102 that uses a network 104 to communicate with a server 106A-106N in a server farm 106. One embodiment of the computing environment 101 includes a client machine 102 that uses a network 104 to request that applications hosted by a server 106A-106N in a server farm 106 execute, and uses the network 104 to receive from the server 106A-106N graphical display output representative of the application execution. In other embodiments, a master node provides the functionality required to identify and provide address information associated with a server 106 hosting a requested application. Still other embodiments include a master node that can be any one of the following: a server 106A-106N within the server farm 106; a remote computing machine connected to the server farm 106 but not included within the server farm 106; a remote computing machine connected to a client 102 but not included within a group of client machines 102; or a client machine 102.

The network 104 between the client machine 102 and the server 106 is a connection over which data is transferred between the client machine 102 and the server 106. Although the illustration in FIG. 1A depicts a network 104 connecting the client machines 102 to the servers 106, other embodiments include a computing environment 101 with client machines 102 installed on the same network as the servers 106. Other embodiments can include a computing environment 101 with a network 104 that can be any of the following: a local-area network (LAN); a metropolitan area network (MAN); a wide area network (WAN); a primary network 104 comprised of multiple sub-networks 104' located between the client machines 102 and the servers 106; a primary public network 104 with a private sub-network 104'; a primary private network 104 with a public sub-network 104'; or a primary private network 104 with a private sub-network 104'. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; a network 104 that includes a wireless link where the wireless link can be an infrared channel or satellite band; or any other network type able to transfer data from client machines 102 to servers 106 and vice versa to accomplish the methods and systems described herein. Network topology may differ within different embodiments, possible network topologies include: a bus network topology; a star network topology; a ring network topology; a repeater-based network topology; a tiered-star network topology; or any other network topology able transfer data from client machines 102 to servers 106, and vice versa, to accomplish the methods and systems described herein. Additional embodiments may include a network 104 of mobile telephone networks that use a protocol to communicate among mobile devices, where the protocol can be any one of the following: AMPS; TDMA;

CDMA; GSM; GPRS UMTS; or any other protocol able to transmit data among mobile devices to accomplish the systems and methods described herein.

Figure 1B:
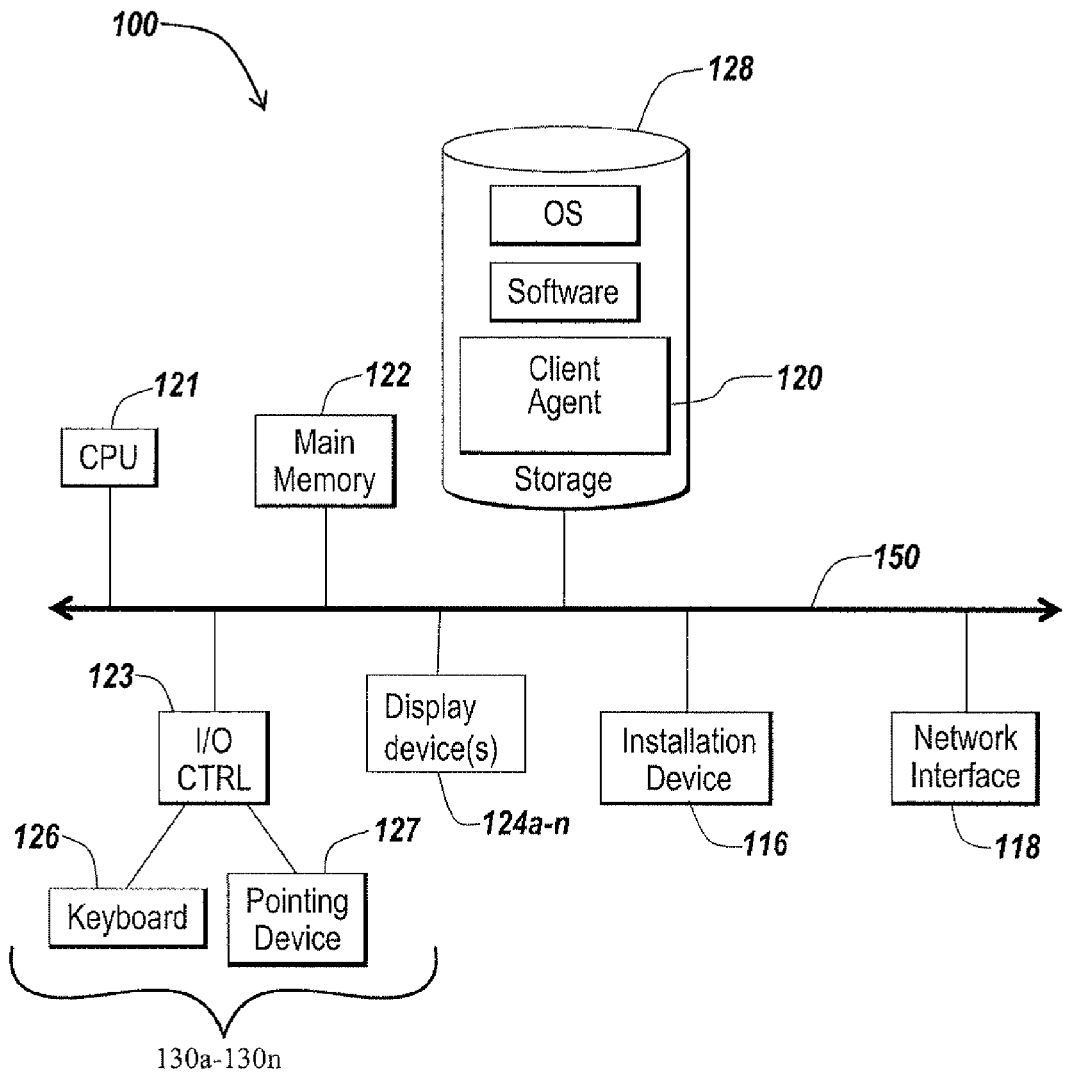
FIG. 1B and 1C are block diagrams that illustrate embodiments of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
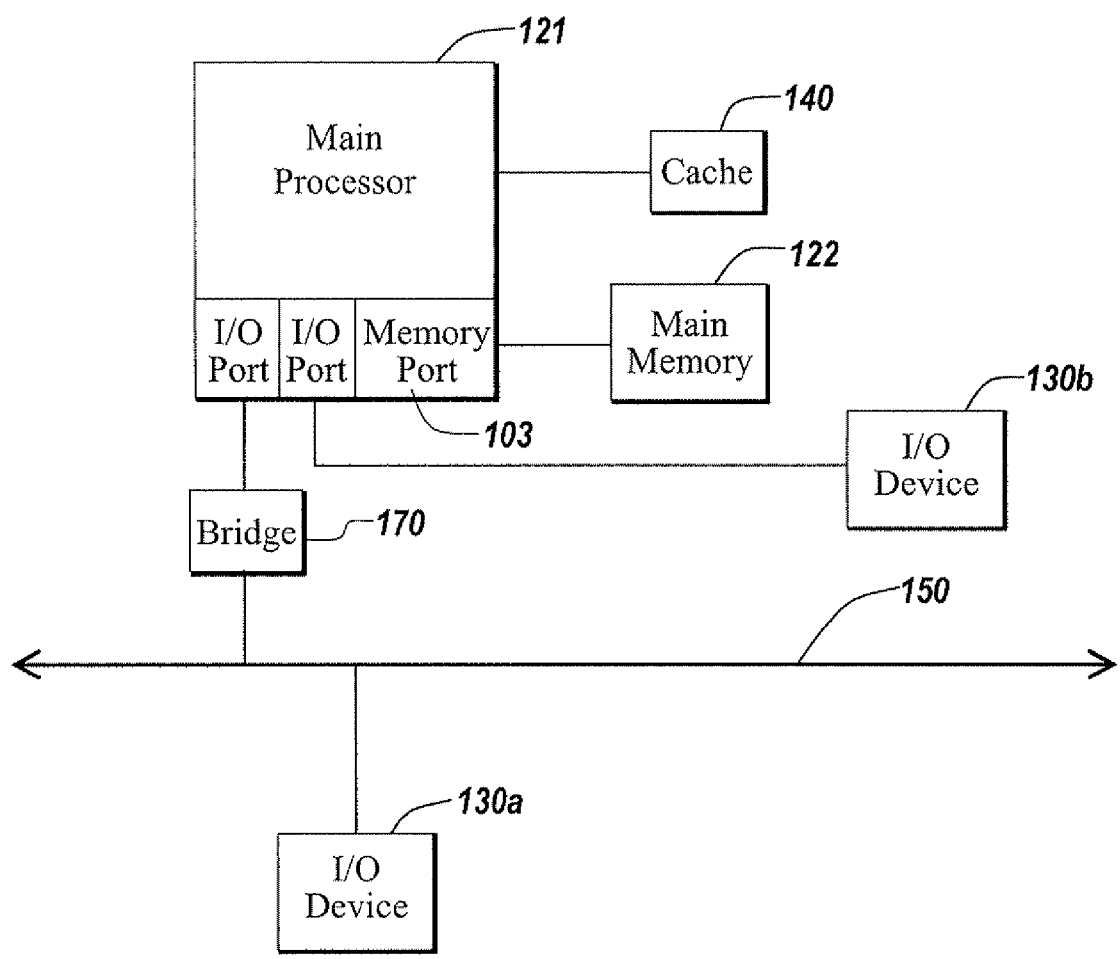

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits capable of executing the systems and methods described herein. Still other embodiments of the central processing unit 122 may include any combination of the following: a microprocessor, a microcontroller, a central processing unit with a single processing core, a central processing unit with two processing cores, or a central processing unit with more than one processing cores.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O devices 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121 via an Advanced Graphics Port (AGP). Still other versions of the computing machine 100 include a processor 121 connected to an I/O device 130A-130N via any one of the following connections: HyperTransport, Rapid I/O, or InfiniBand. Further embodiments of the computing machine 100 include a communication connection where the processor 121 communicates with one I/O device 130A using a local interconnect bus and with a second I/O device 130B using a direct connection.

Included within some embodiments of the computing device 100 is each of a main memory unit 122 and cache memory 140. The cache memory 140 can in some embodiments be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein. The main memory unit 122 and/or the cache memory 140 can in some embodiments include one or more memory devices capable of storing data and allowing any storage location to be directly accessed by the central processing unit 121. Further embodiments include a central processing unit 121 that can access the main memory 122 via one of either: a system bus 150; a memory port 103; or any other connection, bus or port that allows the processor 121 to access memory 122.

One embodiment of the computing device 100 provides support for any one of the following installation devices 116: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments of an I/O device 130 may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a Fibre-Channel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments of the computing machine 100, an operating system may be included to control task scheduling and access to system resources. Embodiments of the computing device 100 can run any one of the following operation systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system capable of running on the computing device and performing the operations described herein. One embodiment of the computing machine 100 has multiple operating systems installed thereon.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. Still other embodiments of the computing environment 101 include a mobile computing device 100 that can be any one of the following: any one series of Blackberry, or other handheld device manufactured by Research In Motion Limited; the iPhone manufactured by Apple Computer; any handheld or smart phone; a Pocket PC; a Pocket PC Phone; or any other handheld mobile device supporting Microsoft Windows Mobile Software.

Figure 2A:
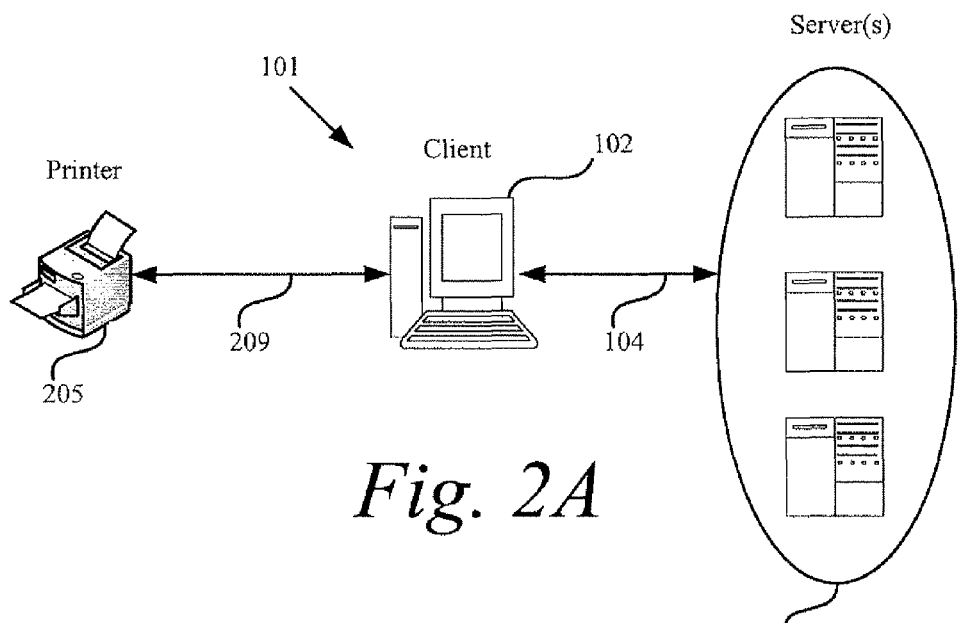
FIGS. 2A and 2B are block diagrams that illustrate an embodiment of a remote-access, networked environment with a client machine that communicates with a server and printer(s).
Figure 2B:
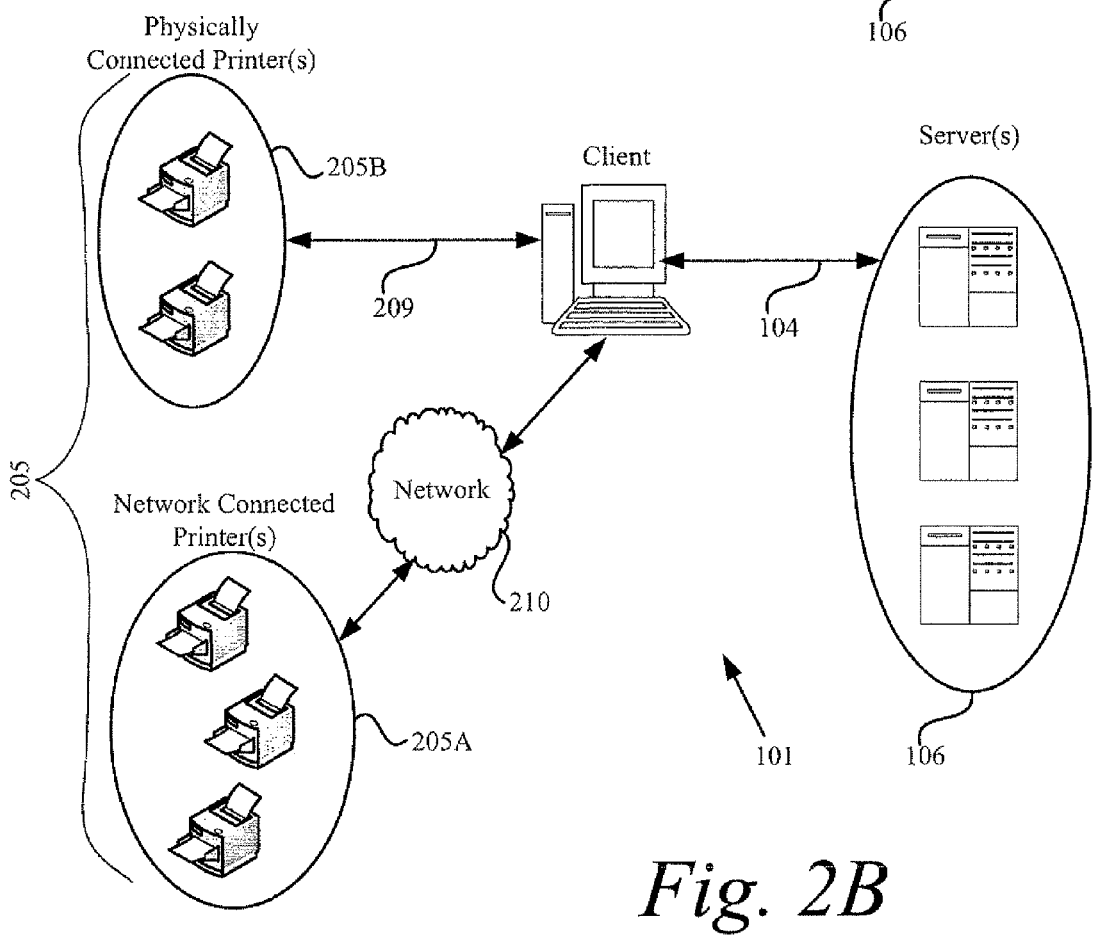

Displayed in FIG. 2A is an embodiment of a computing environment 101 with a client machine 102, servers 106, and a printer 205. A network 104 is located between the client machine 102 and the servers 106, and a connection 209 is located in between the client machine 102 and the printer 205. FIG. 2B illustrates an embodiment of a computing environment 101 that includes a client machine 102, servers 106, physically connected printers 205B and networked printers 205A. Together the physically connected printers 205B and the networked printers 205A are a group of printers 205 included within the environment 101. A network 104 is located in between the client machine 102 and the servers 106. Another network 210 is located in between the client machine 102 and the networked printers 205A; and a connection 209 is located in between the client machine 102 and the physically connected printers 205B. Other embodiments of the computing environment 101 include any combination of client machine 102, server(s) 106 and network 104, 210.

Further referring to FIG. 2A, and in more detail, in the illustrated embodiment of the computing environment 101, the client machine 102 communicates with one or more servers 106 via the network, while the client machine 102 communicates with the printer 205 via a connection 209 installed between the client machine 102 and the printer 205. In some embodiments, the connection 209 is a cable such as any of the following: a serial cable; a parallel cable; a USB cable; a firewire cable; an Ethernet cable; or any other physical wire configuration able to transmit data between the printer 205 and the client machine 102. The connection 209, in many embodiments, allows a client machine 102 connected to the printer 205 to print documents by sending print commands and formatted print files from the client machine 102 to the printer 205 via the connection 209. In another embodiment, the connection 209 is any type of network connection or network described herein, and is able to physically or virtually connect the client machine 102 to the printer 205.

With reference to FIG. 2B, the computing environment 101 includes a client machine 102 that communicates with servers 106 via the network 104. Further included is a client machine 102 that communicates with a group of physically connected printers 205B via the connection 209, and communicates with networked printers 205A via a network 210. The connection 209 installed between the client machine 102 and the physically connected printers 205B can be embodied as a cable such as a serial cable, a parallel cable, a USB cable, a firewire cable, an Ethernet cable, or any other physical wire configuration able to transmit printer information between the printer 205 and the client machine 102. An embodiment of the network 210 installed between the client machine 102 and the networked printers 205A can include any one of the network types or configurations described herein. One embodiment may include a computing environment 101 where the network 104 installed between the client machine 102 and the servers 106 is substantially the same as the network installed between the client machine 102 and the networked printers 205A. Another embodiment may include a computing environment 101 where the network 104 installed between the client machine 102 and the servers 106 is a substantially different type of network or network configuration than the network 210 installed between the client machine 102 and the networked printers 205A. Still further embodiments include a computing environment 101 where the client machine 102 communicates with any one of the following combinations: a single physically connected printer 205B and one or more networked printers 205A; one or more physically connected printers 205B and a single networked printer 205A; a single networked printer 205A; and a single physically connected printer 205B. The computing environment 101 can be further embodied as an environment 101 that includes a client machine 102 configured to access the servers 106 via an application viewing window generated by the transmission of graphical data using a presentation server protocol or other remote viewing application.

In one embodiment of the environment 101, a client machine 102 communicates with networked printers 205A via a third computing device (not shown) that is located remote from the client machine 102 and remote from the servers 106. This third computing device communicates with the networked printers 205A and with the client machine 102 via a connection that could be any type of connection described herein. In some embodiments, communication between the client machine 102 and the networked printers 205A is accomplished by communicating over a communication path from the client machine 102 to the third remote computing device to the networked printers 205A. Further embodiments may include a third remote computing device that is included within the grouping of servers 106, or an embodiment where the third remote computing device is the same computing device as the server 106.

Figure 3A:
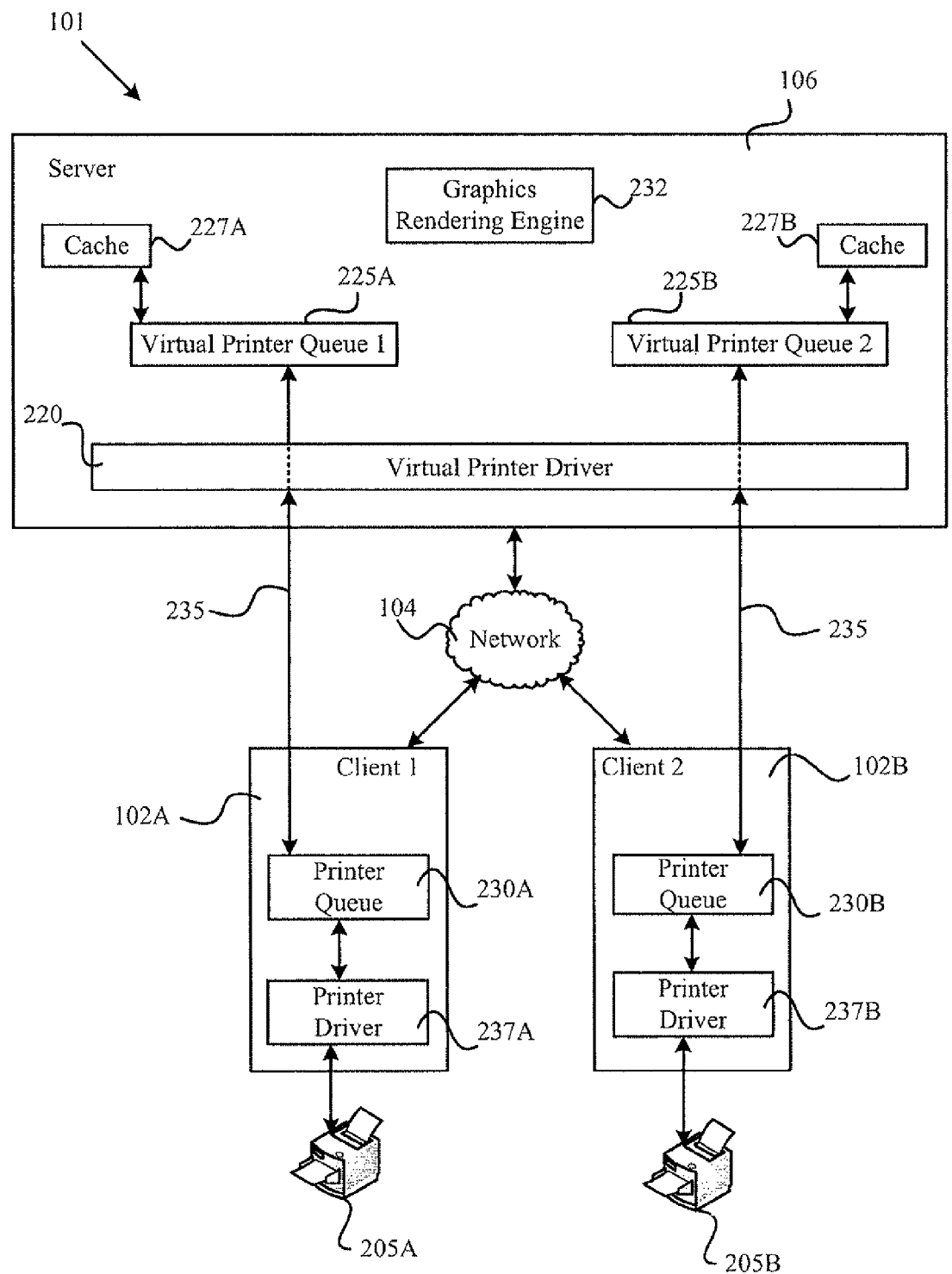
FIG. 3A is a block diagram that illustrates an embodiment of a networked computing environment.

The conceptual block diagram displayed in FIG. 3A illustrates another embodiment of the computing environment 101. Within the environment 101 is a first client machine 102A and a second client machine 102B, where both client machines 102A-102B communicate with a server 106 via a network 104. Each client machine 102A-102B includes a printer queue 230A-230B in communication with a printer driver 237A-237B. Each client machine 102A-102B communicates with a printer 205A-205B, while each printer 205A-205B communicates with a printer driver 237A-237B. The server 106 further includes a graphics rendering engine 232 and a virtual printer driver 220. In communication with the virtual printer driver 220 are individual virtual printer queues 225A-225B that further communicate with and utilize cache memory storages 227A-227B. Installed between the virtual printer queues 225A-225B and their corresponding printer queues 230A-230B, are virtual channels 235. One embodiment may include an environment 101 with virtual channels 235 established over the network 104. Some embodiments may include an environment 101 with client machines 102A-102B that do not have printer queues 230A-230B and/or printer drivers 237A-237B, but rather use printing routines (not shown) that accept print requests and manage printing. These routines can, in some embodiments, reside within an operating system on the client machine 102A-102B.

The virtual printer driver 220, in one embodiment, is located on the server 106 and can both create and manage a plurality of virtual printer queues 225A-225B. In another embodiment, the virtual printer driver 220 executes on a host machine 106 in a networked computing environment. In still another embodiment, the plurality of virtual printer queues 225A-225B are created according to retrieved printer setting information. In yet another embodiment, the virtual printer driver 220 may use retrieved printer setting information to identify a plurality of remote printers associated with a client machine 102 in the networked computing environment. In still even another embodiment, the virtual printer driver 220 may associate the plurality of virtual printer queues 225A-225B with a remote printer connected to a client machine 102. In another embodiment the queues are part of the virtual printer driver 220.

Other embodiments can include a virtual printer driver 220 that can generate graphical interfaces that represent setting information associated with a remote printer 205A-205B. In one embodiment, the virtual printer driver 220 displays a graphical interface generated by a third virtual object able to access stored printer settings. One embodiment includes a virtual printer driver 220 that manages the creation and destruction of virtual printer queues 225A-225B, and provides an interface between the virtual printer queues 225A-225B and the client machines 102A-102B. Other embodiments include a virtual printer driver 220 that interrogates remote printers 205A-205B connected to client machines 102A-102B in response to any one of the following events: a timeout that occurs when a counting mechanism reaches a pre-determined time value; the creation or destruction of a connection between a client machine 102A-102B and the server 106; the creation or destruction of one or more virtual channels 235; or when an application requests printer settings that are not stored in cache 227A-227B, for example, when different settings are requested or when settings expire due to a change in the remote printer. Printer settings show the capability of a particular printer and include, for example, portrait and landscape options, paper size and source, page resizing and ordering, duplex printing and page margins. Some of the printer settings include preferences for a default print job. In some embodiments, interrogation is carried out by the virtual printer driver 220 and can encompass any of the following activities: an enumeration of a list of the remote printers 205A-205B the client machine 102A-102B can print to; an enumeration of a list of the remote printers 205A-205B the client machine 102A-120B is currently connected to; an enumeration of a list of the remote printers 205A-205B with corresponding printer drivers 237A-237B installed on the client machine 102A-102B; retrieval of printer settings from the remote printers 205A-205B; retrieval of printer settings from the printer drivers 237A-237B; retrieval of printer settings from the printer queues 230A-230B; or any combination of the above mentioned activities. In other embodiments, an enumeration of a list of the remote printers 205A-205B can trigger an interrogation of the remote printers and retrieval of printer settings. In one embodiment, the enumeration process is initiated when a user signs on to a client machine 102A-102B. In some embodiments, the enumeration process can time-out or be disrupted. Upon resumption of the enumeration process, the remote printers 205A-205B may be re-interrogated for setting information. Other embodiments include a virtual printer driver 220 with an application or virtual object that is able to provide substantially the same function as the virtual printer queues 225A-225B such that this application or virtual object may intercept print requests, manage print information, and format printer data according to stored printer configuration settings. In this embodiment, the virtual printer driver 220 communicates directly with cache memory 227A-227B and virtual printer queues 225A-225B are note used. While the virtual printer driver 220 resides on the server 106, other embodiments include a virtual printer driver 220 that resides on a third computing machine (not shown) located remote from the server 106 and the client machines 102A-102B.

Virtual printer queues 225A-225B, in many embodiments, are associated with a remote printer 205A-205B in communication with a client machine 102A-102B. In these embodiments, the virtual printer queues 225A-225B function substantially similar to the printer queues 230A-230B installed on the client machines 102A-102B, but differ in that they are dynamically generated based on retrieved printer settings and user input. From the operating system's point of view, the virtual printer queue represents the associated remote printer. Dynamically generated virtual printer queues 225A-225B are printer queues generated in response to an event or condition and subsequently destroyed, maintained or reused. In some embodiments, the virtual printer queues 225A-225B are generated in response to an application being initiated and continues to be associated with that application. In one embodiment, the lifetime of the virtual printer queues 225A-225B is at least as long as the lifetime of the associated application. The application therefore sees and interacts with a stable set of printer queues 225A-225B during the application's lifetime. While printer settings of a printer queue may vary during the lifetime of an application, the enumeration of virtual printer queues and the names of the virtual printer queues 225A-225B do not change. Providing a stable set of printer queues 225A-225B can provide a stable interface to shelter applications executing on a server from changes in the associated printers by dynamically adapting the printer queues 225A-225B to support the applications and the available printers.

In some embodiments, the virtual printer queues 225A-225B possess characteristics that are substantially similar to those characteristics of the printer queues 230A-230B; and in some embodiments, the virtual printer queues 225A-225B possess characteristics substantially similar to those characteristics of the printer drivers 237A-237B. Virtual printer queue 225A-225B characteristics can include any of the following: the ability to intercept print requests generated by executing applications; ability to format information to be printed according to the settings of a remote printer 205A-205B; the ability to manage and respond to intercepted print requests; and the ability to apply user-specified settings to printer data. Virtual printer queues 225A-225B can communicate directly with printer queues 230A-230B on the client machines 102A-102B, or in some embodiments, can communicate with the printer queues 230A-230B via the virtual printer driver 220. Another embodiment includes virtual printer queues 225A-225B that communicate directly or remotely with either of the printer queue 230A-230B or the printer driver 237A-237B via the virtual channel 235 and over the network 104. Other embodiments include virtual printer queues 225A-225B that are associated with remote printers 205A-205B. In this embodiment, when print requests are sent to a printer 205 in communication with the server 106, the virtual printer queue 225 associated with the remote printer 205 connected to the client machine 102 that caused the print request to be issued, intercepts the print request and further causes the virtual printer driver 220 to send commands to the printer queue 230 and indirectly to the print driver 237, to cause the remote printer 205 associated with the virtual printer queue to carry out the print request. In some embodiments, the association between a virtual printer queue 225A-225B and a remote printer 205A-205B can be created when a remote printer is discovered by either the virtual printer driver 220 or another application, when the virtual printer queue 225A-225B is created, or at another point in time when the virtual printer queue 225A-225B exists and the remote printer 205A-205B is known. In one embodiment, pre-existing, dynamic virtual printer queues 225A-225B are associated with one or more remote printers 205A-205B that are further associated with a single client machine 102A-102B such that pre-existing virtual printer queues 225A-225B are re-assigned when new printers are discovered, by the virtual printer driver 220, that are associated with the single client machine 102A-102B. Still other embodiments include virtual printer queues 225A-225B that are not dynamic, but rather are statically assigned to a printer 205A-205B or printer queue 230A-230B. In one embodiment the virtual printer driver 220 works in conjunction with the virtual printer queues 225A-225B to intercept print requests and relay them to the virtual printer queues 225A-225B, and in other embodiments a third application executing on either the server 106, or a machine remote from the server 106 and remote from the client machine 102A-102B, intercepts the print requests and relays them to the virtual printer queues 225A-225B. Embodiments can include virtual printer queues 225A-225B with any combination of the characteristics of the below described printer queues 230A-230B.

Cache memory storages 227A-227B are in communication with the virtual printer queues 225A-225B, in some embodiments. In one embodiment, the virtual printer queues 225A-

225B use the cache memory storage 227A-227B to store printer settings and other data associated with the remote printer 205A-205B to which a particular virtual printer queue 225A-225B is associated Cache can be a single repository or more than one repository. Similarly, different repositories may be shared by one or more virtual printer queues 225A-225B. In some embodiments, the cache memory storage 227A-227B stores the printer settings in cache 227A-227B when the settings are first received by the virtual printer driver 220. The virtual printer queues 225A-225B may retrieve information from user-input data, the remote printers 205A-205B, the printer drivers 237A-237B, the printer queues 230A-230B, the virtual printer driver 220, or any other information source; this information, in many embodiments, is stored in cache 227A-227B. In other embodiments, the cache 227A-227B is available for use to the virtual printer driver 220 or any other virtual object or application on the server 106. Still other embodiments include virtual printer queues 225A-225B that group printer settings within the virtual printer queues 225A-225B rather than use the cache 227A-227B. In one embodiment, the virtual printer driver 220 is configured to store information retrieved by the virtual printer queues 225A-225B in adjunct memory storage located remote from the cache 227A-227B. Other embodiments include virtual printer queues 225A-225B that store the printer settings in a storage repository located on a computing machine separate from and located remotely from the server 106 and/or the client machines 102A-102B.

In an illustrative embodiment, and referring to FIG. 3A, client 1 102A is associated with one printer queue 1 102A, one printer driver 237A and a plurality of printers 105A (only one printer is shown). An agent (not shown) may be present in client 1 102A to receive print requests from the server 106, and to forward the requests to the printer queue 230A. In one embodiment, there is only one virtual printer queue 225A associated with the plurality of printers. The default printer settings correspond to the settings of a default printer, but may be changed, for example, when a different printer is selected, or when the application requests a different setting. In another embodiment, while virtual printer queue 225A remains active, the application requests for a printer 205B on client 2 102B, or the user logs into client 2 102B to access printer 205B, for example. A virtual channel 235 is established between client 2 102B and the virtual printer queue 225A, via the virtual printer driver 220. The virtual printer queue 225A interrogates the printer queue 230B for printer setting information associated with the printer 205B, and dynamically updates the existing virtual printer queue 225A. Therefore, the application interfaces with a single stable virtual printer queue 225A.

Further referring to FIG. 3A, in one embodiment, printer queues 230A-230B are applications or virtual objects on the client machine 102A-102B that are able to respond to and manage print requests generated by applications. Printer queues 230A-230B are substantially similar to virtual printer queues 225A-225B, but differ in that they are static objects on the client machine 102A-102B able to communicate directly with the remote printers 205A-205B and respond to applications executing on the client machine 102A-102B rather than those executing on the server 106. Embodiments may include printer queues 230A-230B that intercept print requests generated by applications, manage one or more print requests generated by one or more applications executing on the client machine 102A-102B, and respond to print requests by transmitting formatted data to the remote printer 205A-205B. In this embodiment, the user-setting and printer-setting information is used by the remote printers 205A-205B to print documents according to the specified setting information. Printer queues 230A-230B have the ability to interface with printer drivers 237A-237B to retrieve printer settings, transmit between the printer queue 230A-230B and the printers 205A-205B, and further manage printing on the client machine 102A-102B. In some embodiments, the printer queues 230A-230B are further able to generate and store an enumeration of the remote printers 205A-205B the client machine 102A-102B can use to print. Other embodiments include printer queues 230A-230B that can retrieve user-defined printer settings, store the retrieved user-defined printer settings, and utilize the retrieved settings to format printer information. In one embodiment, the client machine 102A-102B includes an operating system with an application configured to function substantially similar to a printer queue 230A-230B, where the client machine 102A-102B does not include a printer queue 230A-230B. In this embodiment, the application on the client machine 102A-102B can be any one of: a set of routines; a software application, an operating system component, a third virtual object able to interface with the operating system, or any other application or virtual object able to facilitate printing on the client machine 102A-102B in a manner substantially similar to that of the printer queue 230A-230B. Still other embodiments may include a client machine 102A-102B with any of the following configurations: a printer queues 230A-230B configured to store a list of printers like the list described above, and a separate virtual object configured to store printer setting information like the types of printer setting information enumerated above; a printer queue 230A-230B configured to store printer setting information like the types of printer setting information enumerated above, and a separate virtual object configured to store a list of printers like the list described above; or an application executing on the client machine 102A-102B configured to store either one or both of a list of printers like the list of printers described above, and printer setting information like the types of printer setting information enumerated above. Some embodiments may include printer setting information that identifies a remote printer 205A-205 B as a default printer, while other embodiments include printer setting information that does not identify a default printer within a list of remote printers 205A-205 B. The list of printers, can in one embodiment, include both printer devices currently connected to the client machine 102, and printer devices to which the client machine 102 can print. In another embodiment, the list can include both printers 205A-205B that the client machine 102A-102B is connected to, and printers 205A-205 B to which the client machine 102A-102B can connect and print.

Printer drivers 237A-237B are included in the client machines 102A-102B, and interface with the printer queue 230A-230B. In one embodiment, printer drivers 237A-237B are included to facilitate communication between the client machine 102A-102B and the printers 205A-205B by converting printer-specific settings, printer instructions, machine code and print data sent from the printer 205A-205B to the client machine 102A-102B into a format able to be read and understood by the client machine 102A-102B and the printer queue 230A-230B. Some embodiments include a client machine 102A-102B with a separate application or object located between the printer queue 230A-230B and the printer driver 237A-237B able to further interpret data sent from the printer driver 237A-237B into a format able to read and understood by the printer queue 230A-230B. Printer drivers 237A-237B can, in some embodiments, differ according to the printer 205A-205B the driver is associated with. These differences in printer drivers 237A-237B result from the differences in hardware configuration and output data formats that exist, between varying printers 205A-205B.

In some embodiments, the server 106 includes a graphics rendering engine 232 that can be in communication with any one of the virtual printer driver 220, the virtual printer queues 225A-225B or cache memory 227A-227B. Other embodiments may include a server 106 that does not include a graphics rendering engine 232, or a server 106 with a graphics rendering engine 232 that does not communicate with one or all of the virtual printer driver 220, the virtual printer queues 225A-225B or cache memory 227A-227B. In one embodiment, the included graphics rendering engine 232 accepts printer setting information from the virtual printer driver 220 and uses the accepted setting information to format a graphical display according to the settings of a remote printer 205A-205B and a display that is representative of both the remote printer 205A-205B settings and the user-defined settings. Other embodiments include a graphics rendering engine 232 that outputs a display of a print preview screen displaying a document selected by the user. In this embodiment, the graphics rendering engine 232 formats the display of the print preview screen so that the display is representative of the layout of a document printed by a remote printer 205A-205B that corresponds to the printer setting information used to format the print preview display. The accepted setting information can in one example include a landscape page orientation setting, or in another example include a letter-size paper setting. An exemplary display of the print preview screen where the accepted setting information includes a landscape page orientation setting is a display generated by the graphics rendering engine 232 and that displays a display of the chosen document on a landscape-oriented canvas. While the graphics rendering engine 232 is on the server 106, in other embodiments the graphics rendering engine 232 can be an application included within an operating system installed on the server 106, or in other embodiments be an application executing on a computing machine located remote from the server 106.

Figure 3B:
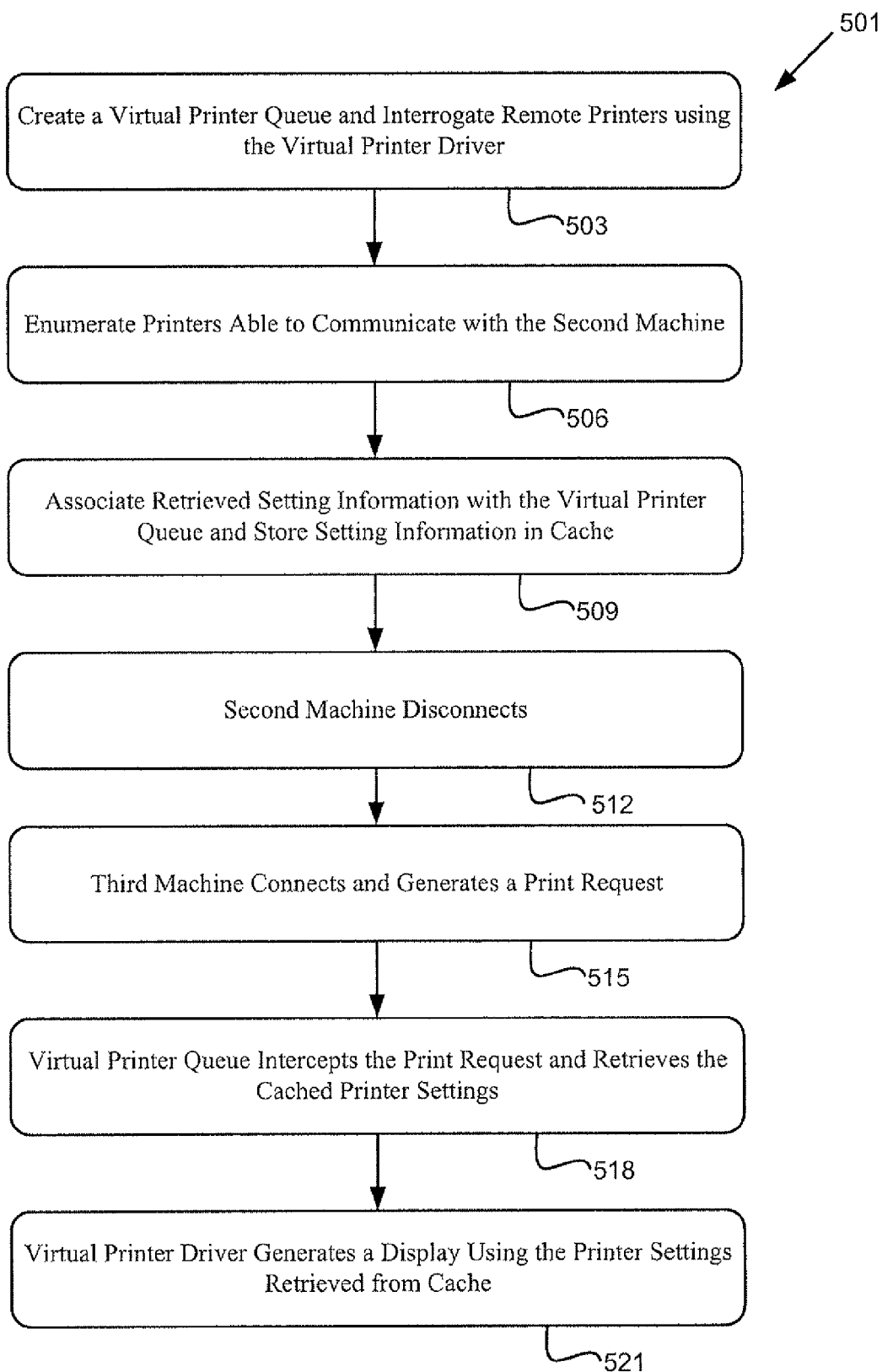
FIG. 3B-D are flow diagrams illustrating embodiments of methods for managing printer settings in a networked computing environment.

Illustrated in FIG. 3B is a method 501 of managing print requests that includes responding to a print request by creating a virtual printer queue 225A-225B and further interrogating remote printers 205A-205B using the virtual printer driver 220 (step 503). Interrogation of the remote printers 205A-205B results in an enumeration of remote printers 205A-205B able to communicate with the second machine (step 506). Once the virtual printer driver 220 receives an enumeration of the printers 205A-205B, the virtual printer driver 220 can then retrieve printer setting information and associate the retrieved printer setting information with the virtual printer queue 225A-225B and further store the retrieved printer setting information in cache memory 227A-227B (step 509). The method 501 further includes detecting a disconnection of the second machine from the first machine (step 512), and detecting a connection of a third machine to the first machine, where a user on the third machine causes a print request to be generated by an application executing on the first machine (step 515). The previously created virtual printer queue 225A-225B intercepts the print request initiated by a user via the third machine, and retrieves the cached printer settings associated with that virtual printer queue 225A-225B (step 518). The virtual printer driver 220 then generates a display using the printer settings retrieved from cache 227A-227B, and further shows the resultant display to the third machine (step 521).

Further referring to FIG. 3B and in more detail, the created virtual printer queue 225A-225B and the virtual printer driver 220 reside on a first machine. The first machine can be either of a server 106 or a client machine 102A-102B. In one embodiment, the virtual printer driver 220 responds to a print request by creating a virtual printer queue 225A-225B and interrogating remote printers 205A-205B in communication with the client machine 102A-102B (step 503). Other embodiments include a method 501 where the virtual printer driver 220 first interrogates the remote printers 205A-205B and then creates the virtual printer queue 225A-225B. Still other embodiments include a method 501 where interrogation includes causing the remote printers 205A-205B to return printer setting information, and a printer queue 230A-230B configured to return the printer setting information generated by the remote printers 205A-205B along with additional printer setting information that includes user-defined printer settings.

The enumeration of printers able to communicate with the second machine (step 506) can include a designated default printer. In some embodiments, a designated default printer is associated with the created virtual printer queue 225A-225B, in other embodiments; one of the enumerated printers 205A-205B is identified and associated with the created virtual printer queue 225A-225B.

In one embodiment, the created virtual printer queue 225A-225B is associated with an identified remote printer 205A-205B when the settings retrieved during interrogation are stored in a cache memory location 227A-227B associated with the virtual printer queue 225A-226B (step 509). Other embodiments include methods of association and printer setting storage such as the below described methods.

Disconnection by the second machine (step 512) and further reconnection by a third machine (515), can in some embodiments include ending a first user session where the session is carried out between the second machine and the first machine, and beginning another first user session where the session is carried out between the third machine and the first machine. Other embodiments include a disconnection of the second machine and connection of the third machine where the same user executes both the disconnection and the connection. Still other embodiments include a disconnection of the second machine and a connection of the third machine where different users execute the disconnection and the connection. In embodiments where the same user that disconnects the second machine from the first machine, further connects the third machine to the first machine; the printer settings available to the user when connected via the second machine are further available to the user when connected via the third machine. Similarly, when the users in the above described situation are different, the second user connected via the third machine has access to the same printer settings as those settings available to the first user connected via the second machine. The second machine can be either of a client machine 102A-102B or a server 106, while the third machine can be either of a client machine 102A-102B or a server 106.

Figure 3C:
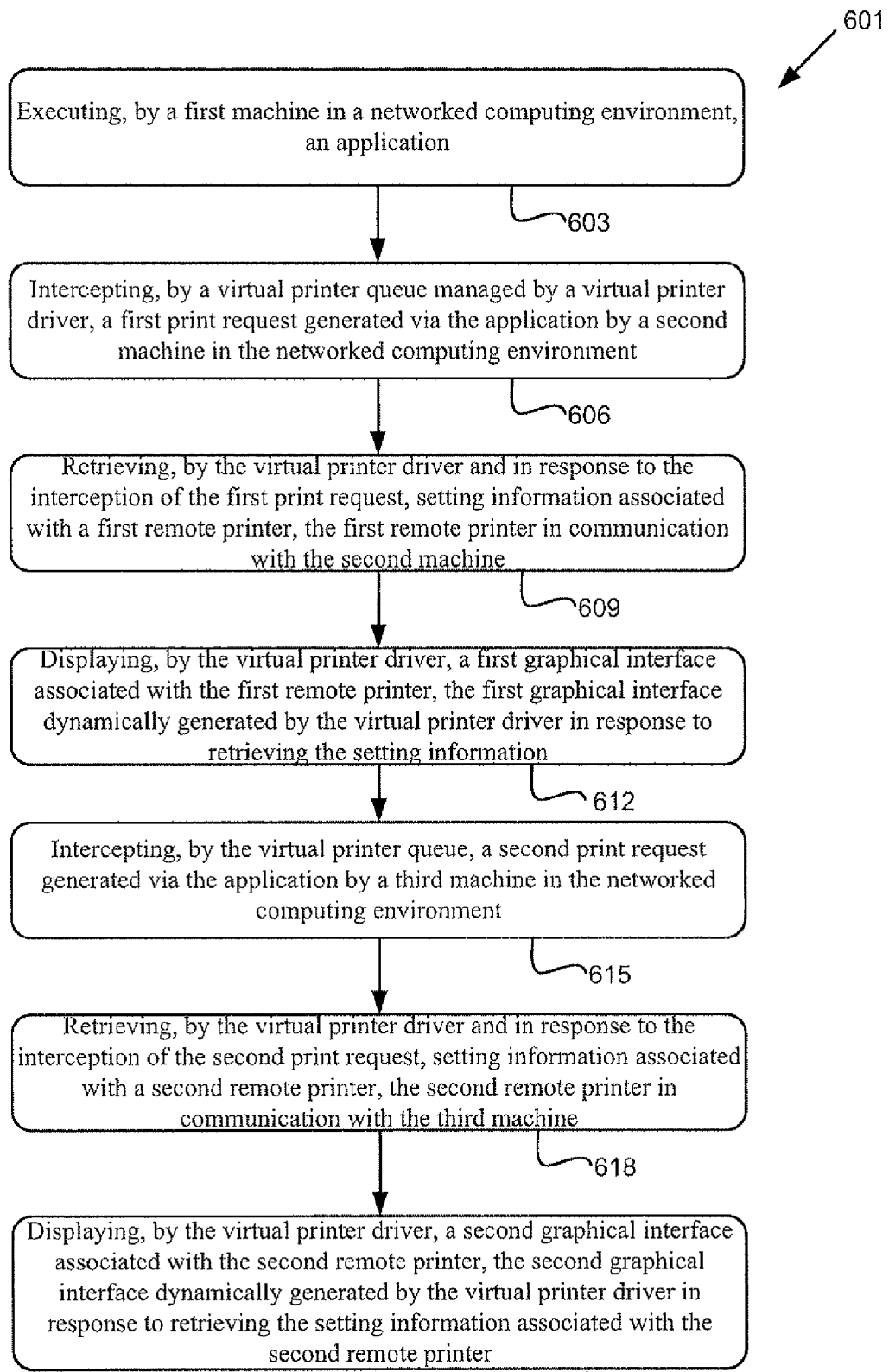

FIG. 3C depicts another embodiment of a method 601 for managing printer settings in a networked computing environment. The method includes executing, by a first machine 106 in a networked computing environment, an application (step 603), intercepting, by a virtual printer queue 225A managed by a virtual printer driver 220, a first print request generated via the application by a second machine 102A in the networked computing environment (step 606). Further, the method includes retrieving, by the virtual printer driver 220 and in response to the interception of the first print request, setting information associated with a first remote printer 205A, the first remote printer 205A in communication with the second machine 102A (step 609), displaying, by the virtual printer driver 220, a first graphical interface associated with the first remote printer 205A, the first graphical interface dynamically generated by the virtual printer driver 220 in response to retrieving the setting information (step 612), intercepting, by the virtual printer queue 225A, a second print request generated via the application by a third machine 102B in the networked computing environment (step 615), and retrieving, by the virtual printer driver 220 and in response to the interception of the second print request, setting information associated with a second remote printer 205B, the second remote printer 205B in communication with the third machine 102B (step 618). The method also includes displaying, by the virtual printer driver 220, a second graphical interface associated with the second remote printer 205B, the second graphical interface dynamically generated by the virtual printer driver 220 in response to retrieving the setting information associated with the second remote printer 205B (step 621).

Further referring to FIG. 3C and in one embodiment, the method includes executing, by a first machine 106 in a networked computing environment, an application (step 603). In some embodiments, the first machine 106 is a server 106. In one embodiment, the application is associated with the software described above in connection with FIG. 1B. In another embodiment, the application provides a user interface that allows a user to select and modify print job settings. In some embodiments, the user interface provides a graphical window displayed on a display unit associated with the server 106.

The virtual printer queue 225A intercepts a first print request generated via the application by a second machine 102A in the networked computing environment (step 606). The virtual printer queue 225A is managed by the virtual printer driver 220. In one embodiment, a virtual printer queue 225A-225B associated with the second machine 102A may or may not exist. In embodiments where the virtual printer queue 225A-225B exists, the virtual printer queues 225A-225B are configured to intercept print requests generated by the application. In some embodiments, the print requests are generated by the application in response to input from a user, for example, when a user accesses the application on the server 106 remotely from the second machine 102A to issue a print request.

The virtual printer driver 220 retrieves, in response to the interception of the first print request, setting information associated with a first remote printer, the first remote printer in communication with the second machine (step 609). In one embodiment, these settings are retrieved from a printer queue 230 on the second machine 102A; while in another embodiment, the settings are retrieved directly from the remote printer 205. In still another embodiment, the settings are retrieved during interrogation of the remote printer 205 connected to the second machine 102A.

The virtual printer driver 220 displays a first graphical interface associated with the first remote printer, the first graphical interface dynamically generated by the virtual printer driver in response to retrieving the setting information (step 612). In some embodiments, the first graphical interface is dynamically generated by the virtual printer driver 220 upon association of the virtual printer queue 225A-225B with a remote printer 205A-205B. In one embodiment, the first graphical interface is displayed on the server 106. In another embodiment, first graphical interface can be displayed on any client machine 102A-B.

The virtual printer queue 225 intercepts a second print request generated via the application by a third machine in the networked computing environment (step 615). In some embodiments, a user accessing the application becomes associated with a third machine 102B. The user remotely accesses the application from the third machine 102B, and may initiate a print request via the application from the third machine 102B.

The virtual printer driver 220 retrieves, in response to the interception of the second print request, setting information associated with a second remote printer, the second remote printer in communication with the third machine (step 618). The third machine 102B, currently associated with the user, is connected to the second remote printer 205B. Therefore, the setting information associated with the second remote printer 205B are retrieved in order to associate new printer capabilities to the virtual printer queue 225A. In response to retrieving the setting information associated with the second remote printer 205B, the virtual printer driver 220 displays a second graphical interface associated with the second remote printer, the second graphical interface dynamically generated by the virtual printer driver 220 (step 621). The user remotely accessing the application from the third machine 102B may view the displayed graphical interface from the third machine 102B. In other embodiments, the second graphical interface may be displayed on a display unit on the server 106.

Figure 3D:
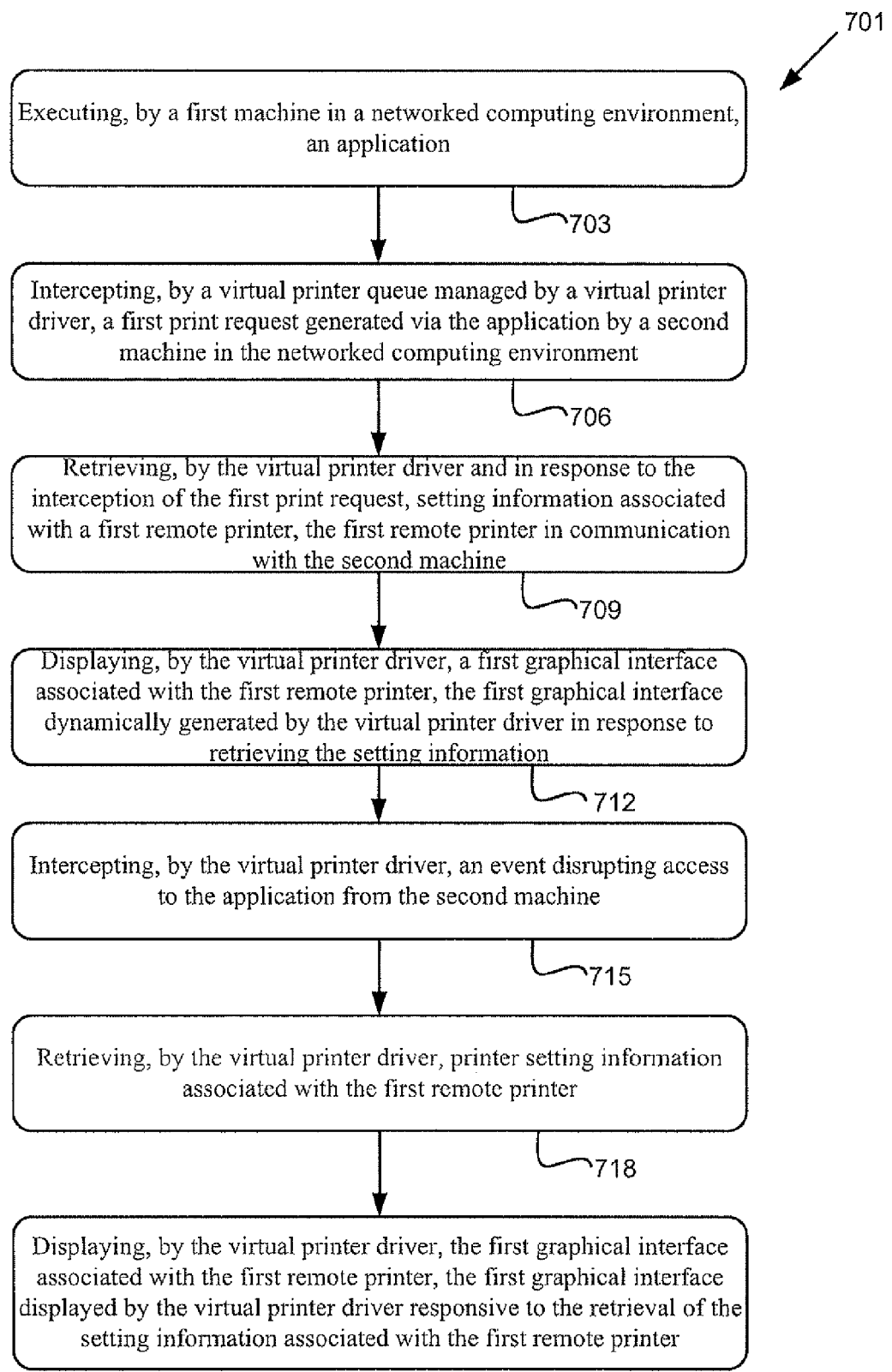

FIG. 3D depicts an embodiment of a method 701 for managing printer settings in a networked computing environment. The method includes executing, by a first machine 106 in a networked computing environment, an application (step 703), intercepting, by a virtual printer queue 225A managed by a virtual printer driver 220, a first print request generated via the application by a second machine 102A in the networked computing environment (step 706). Further, the method includes retrieving, by the virtual printer driver 220 and in response to the interception of the first print request, setting information associated with a first remote printer 205A, the first remote printer 205A in communication with the second machine 102A (step 709), displaying, by the virtual printer driver 220, a first graphical interface associated with the first remote printer 205A, the first graphical interface dynamically generated by the virtual printer driver 220 in response to retrieving the setting information (step 712). The method includes intercepting, by the virtual printer driver 220, an event disrupting access to the application from the second machine 102A (step 715). The method includes retrieving, by the virtual printer driver 220, printer setting information associated with the first remote printer 205A (step 718). The method also includes displaying, by the virtual printer driver 220, the first graphical interface associated with the first remote printer 205A, the first graphical interface displayed by the virtual printer driver 220 responsive to the retrieval of the setting information associated with the first remote printer 205A (step 721).

Further referring to FIG. 3D, the method includes executing, by a first machine 106 in a networked computing environment, an application (step 703). In some embodiments, the first machine 102A is a server 106. In one embodiment, the application is associated with the software described above in connection with FIG. 1B. In another embodiment, the application provides a user interface that allows a user to select and modify print job settings. In some embodiments, the user interface provides a graphical window displayed on a display unit associated with the server 106.

The virtual printer queue 225A intercepts a first print request generated via the application by a second machine 102A in the networked computing environment (step 706). In some embodiments, the virtual printer queue 225A is managed by the virtual printer driver 220. In one embodiment, a virtual printer queue 225A-225B associated with the second machine 102A may or may not exist. In embodiments where the virtual printer queue 225A-225B exists, the virtual printer queues 225A-225B are configured to intercept print requests generated by the application. In some embodiments, the print requests are generated by the application in response to input from a user, for example, when a user accesses the application on the first machine 106 remotely from the second machine 102A to issue a print request.

The virtual printer driver 220 retrieves, in response to the interception of the first print request, setting information associated with a first remote printer 205A, the first remote printer in communication with the second machine 102A (step 709). In one embodiment, these settings are retrieved from a printer queue 230A on the second machine 102A. In another embodiment, the settings are retrieved directly from the remote printer 205A. In still another embodiment, the settings are retrieved during interrogation of the remote printer 205A connected to the second machine 102A.

The virtual printer driver 220 displays a first graphical interface associated with the first remote printer 205A, the first graphical interface dynamically generated by the virtual printer driver 220 in response to retrieving the setting information (step 712). In some embodiments, the first graphical interface is dynamically generated by the virtual printer driver 220 upon association of the virtual printer queue 225A-225B with a remote printer 205A-205B. In one embodiment, the first graphical interface is displayed on the first machine 106. In another embodiment, first graphical interface can be displayed on any machine 102A-102B.

The virtual printer driver 220 intercepts an event disrupting access to the application from the second machine 102A (step 715). In some embodiments, a user accessing the application from the second machine 102A disconnects from the application, for example, due to an event disrupting access to the application from the second machine 102A. An event disrupting access to the application from the second machine 102A may be any form or type of event causing a disconnection between the second machine 102A and the application. In one embodiment, the event disrupting access to the application from the second machine 102A is a connection time-out between the second machine 102A and the application. In another embodiment, the event disrupting access to the application from the second machine 102A is a network disruption between the second machine 102A and the application. In still another embodiment, the event disrupting access to the application from the second machine 102A is a user request to disconnect and reconnect the second machine 102A to the application. In still even another embodiment, the event disrupting access to the application from the second machine 102A is a second print request generated via the application by a third machine 102B in the networked computing environment followed by a third print request generated via the application by the second machine 102A.

The virtual printer driver 220 retrieves printer setting information associated with the first remote printer 205A (step 718). In one embodiment, the virtual printer driver 220 retrieves printer setting information associated with the first remote printer 205A responsive to the event disrupting access to the application. In another embodiment, the virtual printer driver 220 retrieves printer setting information associated with the first remote printer 205A following the event disrupting access to the application. In still another embodiment, the virtual printer driver 220 retrieves printer setting information associated with the first remote printer 205A upon reconnecting the second machine 102A to the application. In still another embodiment, the virtual printer driver 220 retrieves printer setting information while interrogating the first remote printer 205A. In some embodiments, the printer setting information associated with the first remote printer 205A is retrieved to re-establish the printer capabilities to the virtual printer queue 225A.

In response to retrieving the setting information associated with the first remote printer 205A, the virtual printer driver 220 the first graphical interface associated with the first remote printer 205A (step 721). The user remotely accessing the application from the second machine 102A may view the displayed graphical interface from the second machine 102A. In other embodiments, the first graphical interface may be displayed on a display unit on the server 106.

Figure 4:
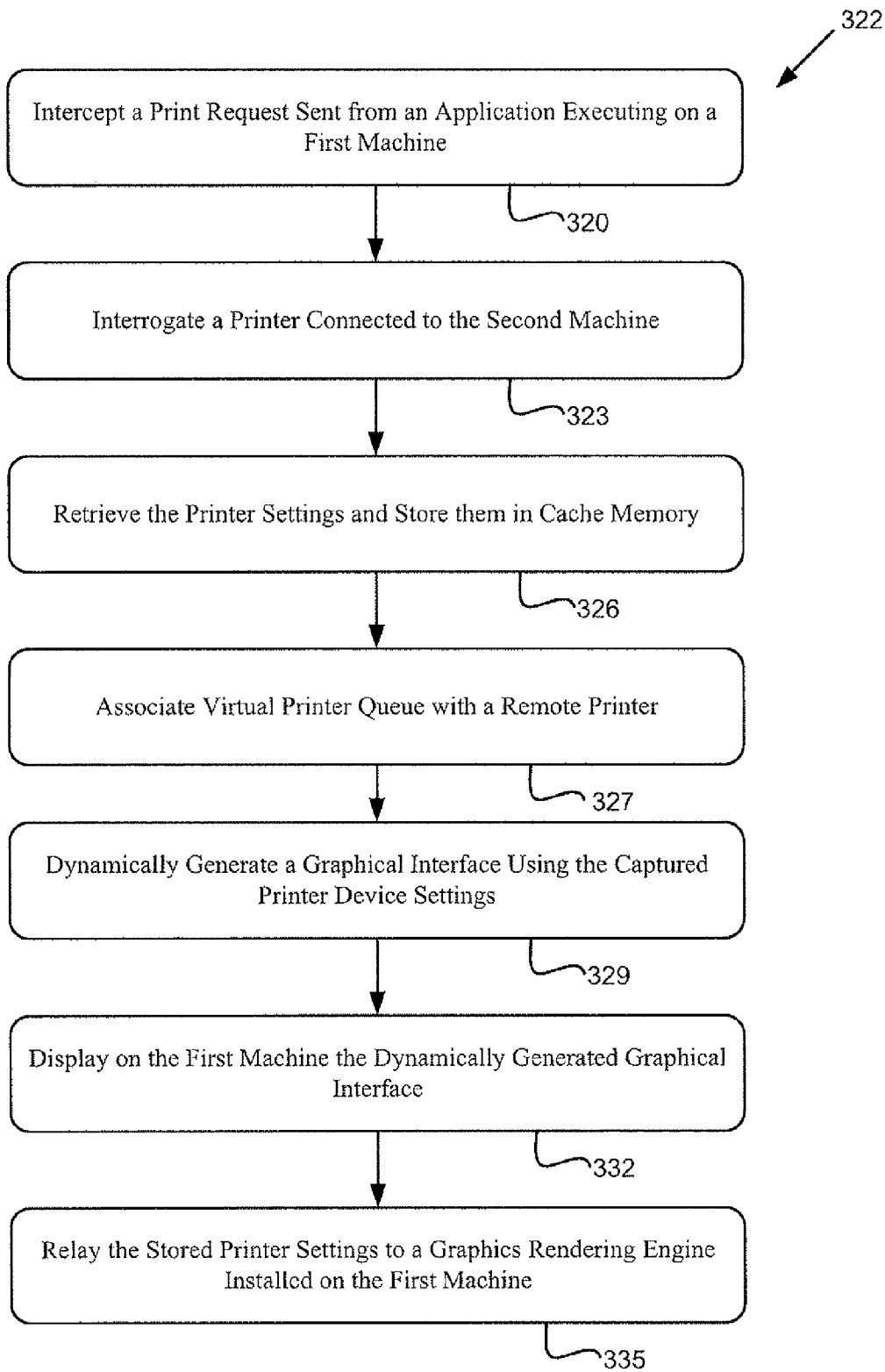
FIG. 4 is a flow diagram illustrating an embodiment of a method for managing printer settings in a networked computing environment.

FIG. 4 depicts an embodiment of a method 322 used by the virtual printer driver 220 to respond to the interception of a print request. This print request is generated by an application executing on the first machine 106 and the virtual printer driver 220 responds to the request by displaying a graphical interface representative of the printer settings associated with the remote printer 205. The process 322 includes: intercepting, with a virtual printer driver 220, a print request sent from an application executing on a first machine 106 (step 320); interrogating, with the virtual printer driver 220, a printer 205 connected to a second machine 102 (step 323); and retrieving, with the virtual printer driver 220, printer settings associated with the remote printer 205 and then storing these settings in cache memory 227A-227B associated with virtual printer queues 225A-225B (step 326). Further, the virtual printer driver 220 associates a virtual printer queue 225A-225B with a corresponding remote printer 205A-205B (step 327), dynamically generates a graphical interface using the printer setting information stored in cache 227A-227B (step 329), displays on the first machine 106 the dynamically generated graphical interface (step 332), and transmits the stored printer settings to the graphics rendering engine 232 on the first machine 102A (step 335). In one embodiment, the process 322 may be implemented in a computing environment 101 as described above.

Further referring to FIG. 4 and in more detail, the virtual printer driver 220 intercepts print requests generated by an application executing on the first machine 106 and sent to a printer associated with the first machine 106. In this embodiment, a virtual printer queue 225A-225B associated with the client may or may not exist. In embodiments where the virtual printer queue 225A-225B exists, the virtual printer queues 225A-225B are configured to intercept print requests generated by an application executing on the first machine 106. Embodiments may include an environment where print requests are generated by an application in response to input from a user; where the input is generated when a user controls the application on the first machine 106 via a viewing window on the second machine 102A to issue a print request.

Interrogating the remote printer 205 connected to the second machine 102A, can in one embodiment occur in response to the interception of a print request by the virtual printer driver 220. In this embodiment, the virtual printer driver 220 responds to a system configuration where no virtual printer queue 225A-225B exists and so a virtual printer queue 225A-225B must be created. Creation of a virtual printer queue 225A-225B can, in some embodiments, occur independently of the interrogation of the remote printers 205A-205B. In other embodiments, creation of the virtual printer queue 225A-225B occurs subsequent to or substantially immediately before the interrogation of the remote printers 205A-205B. In embodiments where the interception of the print request is carried out by virtual printer queues 225A-225B, the virtual printer driver 220 can interrogate the remote printers 205A-205B when a timeout event or other system event occurs, when no printer settings are stored in cache 227A-

227B, or when a command is sent to the virtual printer driver 220 indicating that the remote printers 205A-205B should be interrogated. Other embodiments include virtual printer queues 225A-225B able to intercept print requests such that the remote printer 205 is interrogated in response to any one of the following events: execution of a remote viewing application; a system event generated in response to a timer; a request sent by a server/first machine 106 to a client/second machine 102; a request sent by a client/second machine 102 to a server/first machine 106; or any other event or condition that may trigger the interrogation of a remote printer 205. Interrogation, in some embodiments, includes sending commands from the virtual printer driver 220 to the printer queue 230A-230B on the client machine 102A-102B to enumerate a list of printers 205A-205B able to communicate with the client machine 102A-102B. Other embodiments include an interrogation tactic that causes the virtual printer driver 220 to generate requests for printer setting information which are forwarded to the printer queue 230A-230B. The printer queue 230A-230B may in turn either retrieve a list of compatible printers or printer setting information from a cache or other memory location, or further request from the remote printers 205A-205B via the printer driver 237A-237B, printer setting information.

When the virtual printer driver 220 interrogates the remote printer 205, the virtual printer driver 220, in many embodiments, retrieves printer settings associated with the remote printer 205 and saves these settings in cache memory 227 (step 326). In one embodiment, these settings are retrieved from a printer queue 230 on the second machine 102; while in another embodiment, the settings are retrieved directly from the remote printer 205. The virtual printer driver 220 may in one embodiment store the printer setting information in a memory location remote from the first machine such as a memory location on a third computing machine in a location remote from both the first machine and the second machine.

The method 322 includes a virtual printer driver 220 that associates a virtual printer queue 225A-25B with a remote printer 205A-205B (step 327). Association between the virtual printer queue 225A-225B and the remote printer 205A-205B is, in some embodiments, accomplished by saving the printer settings, retrieved by the virtual printer driver 220, in cache memory 227A-227B. The virtual printer driver 220 in this embodiment may relay the retrieved printer settings to the virtual printer queue 225A-225B so that the virtual printer queue 225A-225B may store the printer settings in an associated cache memory space 227A-227B. Other embodiments include a virtual printer driver 220 that stores the retrieved printer settings in a cache memory space 227A-227B that corresponds to the virtual printer queue 225A-225B that the virtual printer driver 220 identifies as now associated with the interrogated remote printer 205A-205B. Still other embodiments include a virtual printer driver 220 that associates a selected or created virtual printer queue 225A-225B with a remote printer 205A-205B by inserting an identification flag or other identification object within the virtual printer queue 225A-225B to mark that virtual printer queue 225A-225B as associated with the interrogated remote printer 205A-205B. Still other embodiments include a virtual printer driver 220 that associates a selected or created virtual printer queue 225A-225B with a remote printer 205A-205B by inserting a record in a database, where the record includes information indicating that the selected or created virtual printer queue 225A-225B is now associated with the remote printer 205A-205B. Some embodiments include a virtual printer driver 220 that identifies and selects a pre-existing virtual printer queue 225A-225B to associate with a remote printer 205A-205B, while other embodiments include a virtual printer driver 220 that responds to system feedback indicating that a virtual printer queue 225A-225B does not exist by creating a virtual printer queue 225A-225B and associating that virtual printer queue with a remote printer 205A-205B. In still other embodiments, a selected or created virtual printer queue 225A-225B is associated with a client session, a client account or a client machine connected to the remote printer 205A-205B interrogated by the virtual printer driver 220. In yet other embodiments, the virtual printer driver 220 associates a remote printer 205A-205B with the virtual printer queue 225A-225B by mapping a path from the virtual printer queue 225A-225B to the remote printer 205A-205B.

Dynamic generation of the graphical interface that displays the retrieved printer settings is in most embodiments done by the virtual printer driver 220 upon association of the virtual printer queue 225A-225B with a remote printer 205A-205B (step 329). Other embodiments of the process 322 may execute the dynamic generation of the graphical interface before association of the virtual printer queue 225A-225B with the remote printer 205A-205B. The dynamic generation of a graphical interface can signify a graphical interface generated by a virtual printer driver 220 in response to system or application feedback, where the virtual printer driver 220 creates and updates the graphical interface substantially instantaneously in response to substantially real-time retrieval of printer setting information from any one of either: a printer queue 230A-230B, a virtual printer driver 220, or other virtual object, application or storage element.

With further reference to FIG. 4, the virtual printer driver 220, in one embodiment, displays the dynamically generated graphical interface on the first machine (step 332), where the first machine can be anyone of either a client machine 102A-102B or a server 106. The virtual printer driver 220 can in another embodiment display the dynamically generated graphical interface on the second machine, where the second machine can be anyone of either a client machine 102A-102B or a server 106. Still other embodiments of the process 322 may include an independent computing architecture configured to display the dynamically generated graphical interface on the second machine 102. The process 322, in one embodiment, includes relaying the stored printer settings to a graphics rendering engine 232 on the first machine 106 (step 335). One embodiment may include a process 322 that ends once the virtual printer driver 220 displays the dynamically generated graphical interface on the first machine 106.

Figure 5:
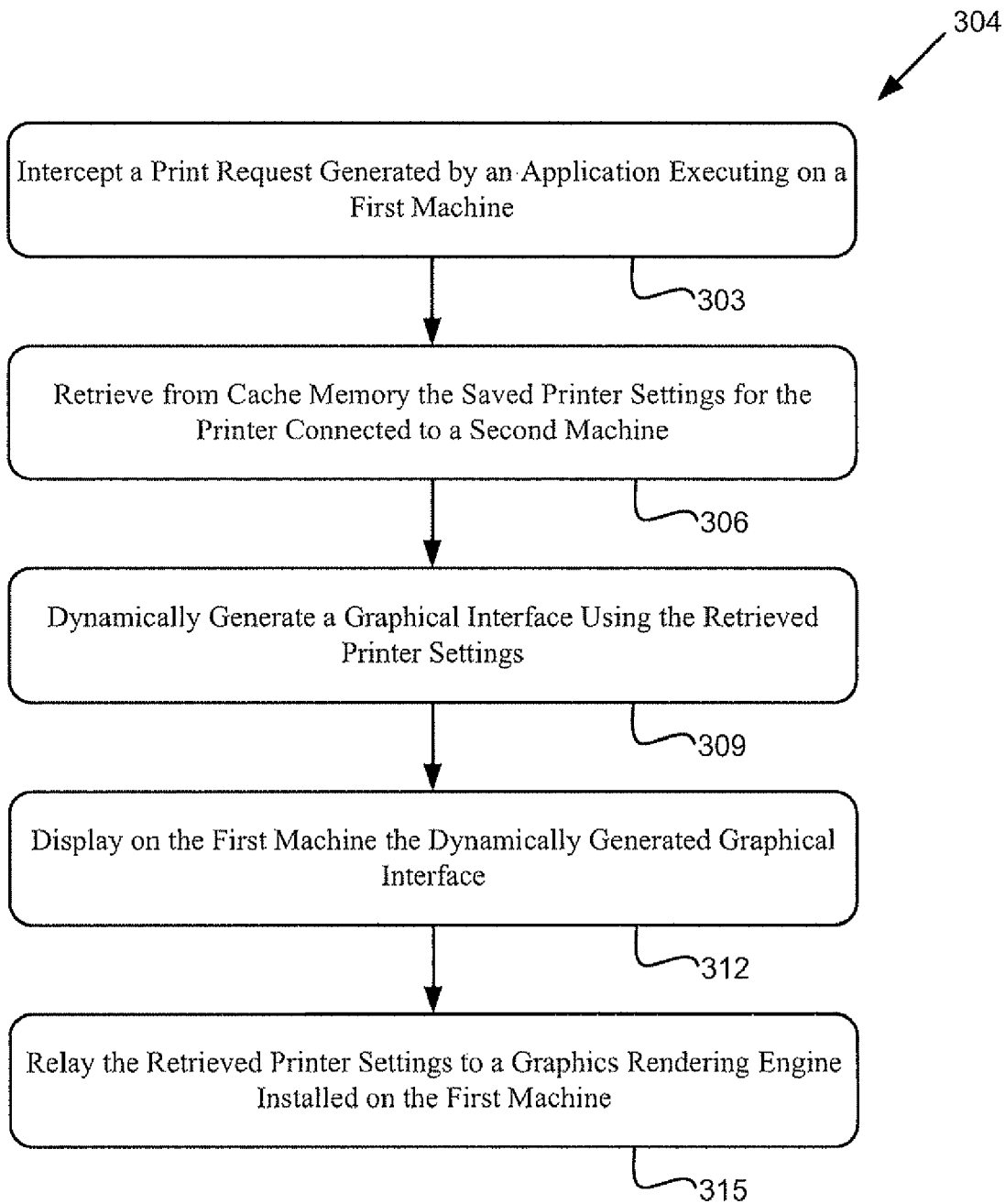
FIG. 5 is a flow diagram illustrating an embodiment of a printing management method that utilizes saved printer settings.

Illustrated in FIG. 5 is one embodiment of a method 304 that commences when a print request generated by an application executing on a first machine 106 (step 303) is intercepted by a virtual printer queue 225A-225B. In some embodiments, a virtual printer driver 220 can respond to the interception of print requests by retrieving, from cache memory 227A-227B, saved printer settings that correspond to a printer 205A-205B in communication with a second machine 102A-102B (step 306). The step of retrieving the printer setting information from cache memory 227A-227B is, in one embodiment followed, by the dynamic generation, by the virtual printer driver 220, of the graphical interface incorporating the retrieved printer settings (step 309). The virtual printer driver 220 in one embodiment, displays the graphical interface on the first machine (step 312), and relays the retrieved printer settings to the graphics rendering engine 232 (step 315).

Using a virtual printer queue 225A-225B to intercept a print request generated by an application executing on a first machine (step 303), can in one embodiment of the method 304, include using the virtual printer driver 220 to prevent the print request from going to a printer queue 230 on the first machine. The first machine can be either one of a server 106 or a client machine 102A-102B. One embodiment of the method 304 includes generating print requests in response to application commands generated by an input device connected to the second machine, and controlled by a user accessing the application via a remote viewing window. Further embodiments include a method of intercepting print requests generated by application such as any of those above described methods for method 322.

In one embodiment, the interception of the print request causes the virtual printer driver 220 to retrieve from cache memory 227A-227B, saved printer setting information associated with a remote printer 205A-205B in communication with a second machine (step 306). Some embodiments include virtual printer queues 225A-225B that respond to the interception of a print request by retrieving printer setting information from an associated cache memory location 227A-227B and forwarding the retrieved settings to the virtual printer driver 220. Other embodiments may include a virtual printer driver 220 that retrieves the printer setting information from a third machine in communication with the first machine and the second machine, and located remote from the first machine and the second machine. The second machine can be either one of a server 106 or a client machine 102A-102B. In one embodiment, printer setting information is generated when the virtual printer driver 220 interrogates a remote printer 205A-205B and receives printer setting information, while in another embodiment, printer setting information is inputted directly into the first machine via a peripheral input device.

The virtual printer driver 220 in one embodiment uses the retrieved printer settings to dynamically generate a graphical interface, where dynamic generation means substantially instantaneous generation of a new graphical interface in response to new printer setting information (step 309). A third virtual object included on any one of the first machine or a third machine located remote from the first machine and second machine, may in one embodiment, accept the retrieved printer setting information and generate the graphical interface. Yet another embodiment of the process 304 may include a third virtual object on the first machine configured to accept the retrieved printer settings and generate the graphical interface. The virtual printer driver 220, in many embodiments, displays the graphical interface on the first machine (step 312) after generating the graphical interface. A third virtual object included on any one of the first machine or a third machine located remote from the first machine and second machine, may in one embodiment, accept the dynamically generated graphical interface and display the graphical interface on the first machine. Yet another embodiment of the process 304 may include a third virtual object on the first machine configured to accept the dynamically generated graphical interface and display the graphical interface on the first machine. The graphical interface may in some embodiments, be displayed on the second machine using an independent computing architecture, or be displayed on a third machine remote from the first machine and the second machine.

Further referring to FIG. 5, once the graphical interface is displayed, the virtual printer driver 220, in some embodiments, can relay the retrieved printer settings to a graphics rendering engine 232 installed on the first machine. This embodiment may include a method 304 that displays the graphical interface on the first machine (step 312), while another embodiment may include a virtual printer driver 220 that relays the retrieved printer settings to a graphics rendering engine 232 installed on a third machine remote from the first machine and the second machine. The graphics rendering engine 232, in one embodiment, uses the retrieved printer settings to create a print preview display of the document to be printed. In this embodiment, the print preview display is further displayed on the on the first machine (step not shown), or in another embodiment, the print preview display is displayed on a second machine (step not shown).

Figure 6:
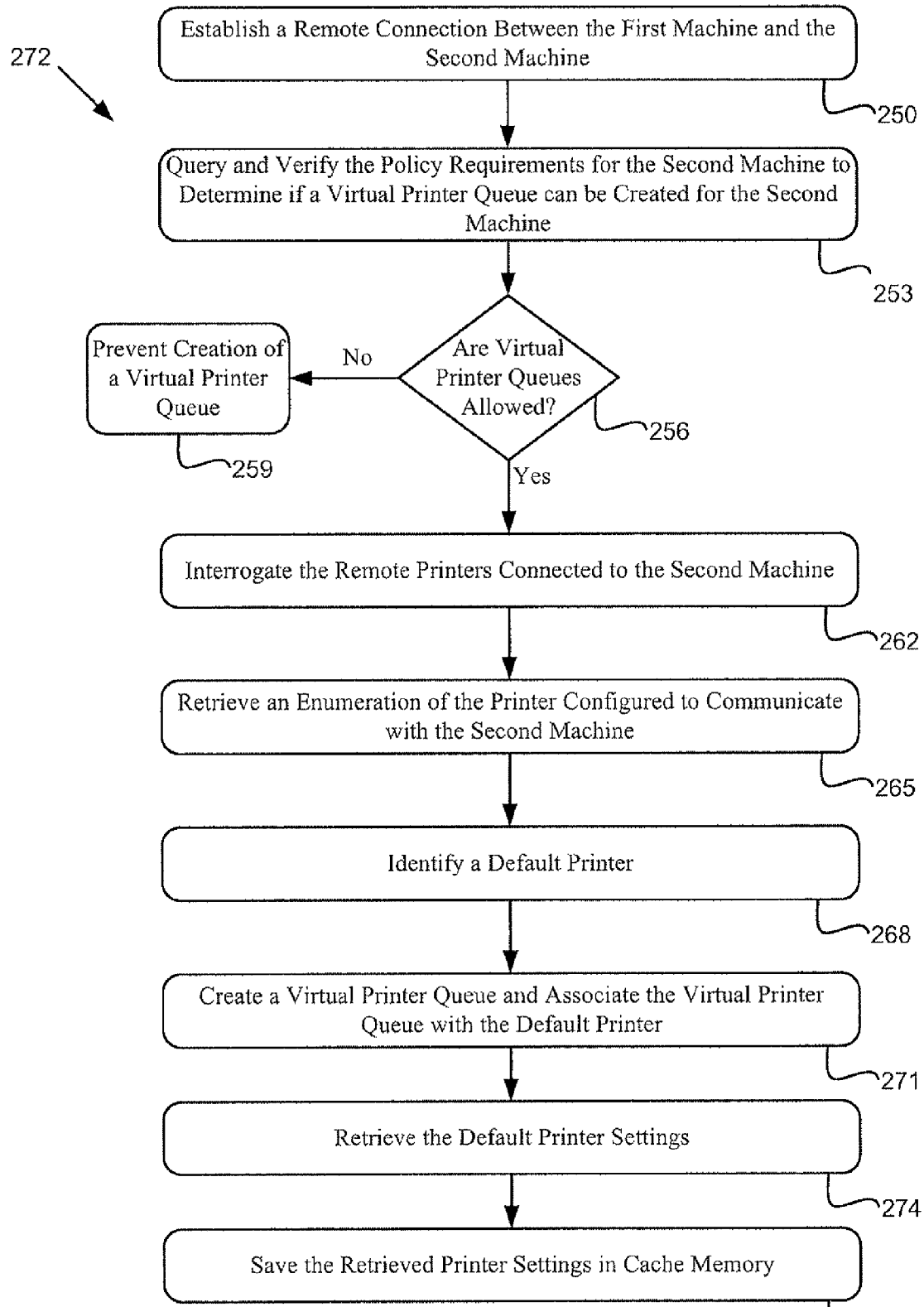
FIG. 6 is a flow diagram illustrating an embodiment of a printing management method that utilizes retrieved printer settings.

Illustrated in FIG. 6 is an embodiment of a method 272 to generate, retrieve and save printer setting information. One embodiment of the method 272 includes the steps of establishing a remote connection between the first machine and the second machine (step 250), and querying and verifying the policy requirements for the second machine to determine if a virtual printer queue 225A-225B can be created for the second machine (step 253). In one embodiment the virtual printer driver 220 then questions whether or not virtual printer queues 225A-225B are allowed (step 256), and if virtual printer queues 225A-225B are not allowed the virtual printer driver 220 prevents the creation of a virtual printer queue 225A-225B (step 259). In one embodiment, when virtual printer queues 225A-225B are allowed, the virtual printer driver 220 responds to the establishment of the remote connection in step 250 by interrogating a remote printer 205A-205B in communication with the second machine (step 262). In another embodiment the virtual printer driver 220 retrieves from the second machine an enumeration of printers 205A-205B configured to communicate with the second machine (step 265). The virtual printer driver 220, in an embodiment, identifies a default printer within the list of printers (step 268), and creates a virtual printer queue 225A-225B that the virtual printer driver 220 associates with the default printer (step 271). In one embodiment, the virtual printer driver 220 retrieves the printer settings associated with the default printer (step 274), and the virtual printer driver 220 saves the retrieved printer settings in cache memory 140 (step 277).

In one embodiment of the method 272, the virtual printer driver 220 interrogates a remote printer 205A-205B when the virtual printer driver 220 detects a system condition indicating that the remote printer 205A-205B should be interrogated. The virtual printer driver 220 may detect a change in a remote printer's settings. Some embodiments can include a virtual printer driver 220 that interrogates a remote printer 205A-205B when the virtual printer driver 220 determines that there are no printer settings stored in cache 227A-227B. Other embodiments include a virtual printer driver 220 that interrogates a remote printer 205A-205B when the virtual printer driver 220 determines that no virtual printer queue 225A-225B exists, or that there exists no enumeration of the printers able to connect to and accept print information from the client machine 102A-102B. Still other embodiments include a virtual printer driver 220 that interrogates a remote printer 205A-205B when any of the following occur: a timeout; the establishment or destruction of a connection between the first machine and the second machine; the establishment or destruction of a virtual channel; a null return to a query requesting cached printer settings; a pre-determined trigger event; or other condition. Embodiments can include a method that utilizes a virtual object on one of either the first machine or second machine, in lieu of the virtual printer driver 220, to decide whether or not a remote printer 205A-205B should be interrogated.

The method 272 can, in one embodiment, query and verify the policy requirements of the second machine to ensure that a virtual printer queue 225A-225B can be created and associated with a remote printer in communication with the second machine (step 253). Other embodiments include a method 272 where no check is performed as to whether or not a virtual printer queue 225A-225B can be created and associated with a remote printer in communication with the second machine. In one embodiment, the virtual printer driver 220 is used to determine whether or not a virtual printer queue may be created, while in other embodiments, another virtual object or application is used to determine whether or not a virtual printer queue may be created.

In one embodiment, when it is determined that virtual printer queues 225A-225B may not be created, the virtual printer driver 220 prevents creation of a virtual printer queue for either a particular printer 205 connected to the client machine 102, or for all printers 205 connected to the client machine 102. Other embodiments include a virtual object, application, or other flag able to prevent the creation of a virtual printer queue 225A-225B associated with either a particular printer 205 or all printers 205 associated with a particular client machine 102.

Further referring to FIG. 6, when it is determined that virtual printer queues 225A-225B may be created and associated with the remote printer 205, the virtual printer driver 220 then interrogates the remote printer(s) 205 connected to the client machine 102 (step 262). Interrogation can include any of the above mentioned methods, techniques or tactics. While in one embodiment interrogation is performed by the virtual printer driver 220, other embodiments include another virtual object on the server 106 or first machine that is able to perform the interrogation.

Resulting from the interrogation is an enumeration of printers configured to communicate with and print from the second machine or client machine 102. In one embodiment, the virtual printer driver 220 is configured to retrieve from the client machine 102, the enumeration of printers (step 265). Some embodiments include a virtual printer driver 220 that retrieves the enumeration from a printer queue 230A-230B, while other embodiments retrieve the enumeration from a cache memory location or other virtual object or storage repository resident on the client machine 102A-102B. In still other embodiments, the client machine 102A-102B is configured to transmit, via an application or other command routine, the enumerated printer list to the server 106 or first machine over the network and using the virtual channel.

The enumerated list of printers generated during the interrogation, in many embodiments, designates a listed printer as the default printer. The virtual printer driver 220 in one embodiment, searches the list of printers to identify a default printer (step 268). Other embodiments may include an application or virtual object on the first machine configured to search through the enumeration of printers 205 to identify a default printer.

In one embodiment, the virtual printer driver 220 creates a virtual printer queue 225A-225B and associates the virtual printer queue 225A-225B with the default remote printer 205A-205B (step 271). Another embodiment may include a method 272 where the virtual printer driver 220 associates the virtual printer queue 225A-225B with the remote printer 205 to which the retrieved settings are associated. A further embodiment includes a method 272 where the virtual printer driver 220 associates a virtual printer queue 225A-225B with the default remote printer by storing printer settings specific to the default remote printer 205, with the virtual printer queue 225A-225B (step 271). One embodiment may include a method 272 that includes using the virtual printer driver 220 to create a virtual printer queue 225A-225B and associate the virtual printer queue 225A-225B with the default printer, another embodiment includes a method 272 where the virtual printer driver 220 associates a pre-existing virtual printer queue 225A-225B with the default printer. Still other embodiments may include a method 272 where the virtual printer driver 220 generates multiple virtual printer queues 225 after interrogating a remote printer 205, the printer queue 230A-230B, or a printer driver 237A-237B. Multiple virtual printer queues 225A-225B, in one embodiment, may be associated with each of the printers listed in the enumeration of printers.

Retrieval of the default printer settings by the virtual printer driver 220 may in some embodiments include retrieving these settings from the printer queue 230 (step 274). Other embodiments may include retrieving these settings from cache memory 227A-227B associated with a virtual printer queue 225A-225B that is further associated with the default remote printer, or retrieving the settings from a third memory location on either the first machine, the second machine, or a third machine located remote from the first machine and the second machine. Another embodiment of the method 272 includes using either an application or additional virtual object on the first machine to retrieve the printer settings. The virtual printer driver 220, in many embodiments, can save the retrieved default printer settings in cache memory 140 (step 277). Cache memory 140 can either be cache memory 140 on the computer, cache memory 227A-227B associated with a virtual printer queue 225A-225B, or other memory location. The saved printer settings can then, in one embodiment, be used by the virtual printer driver 220 to generate graphical interfaces. In one embodiment, the settings may not be saved in cache memory.

Figure 7:
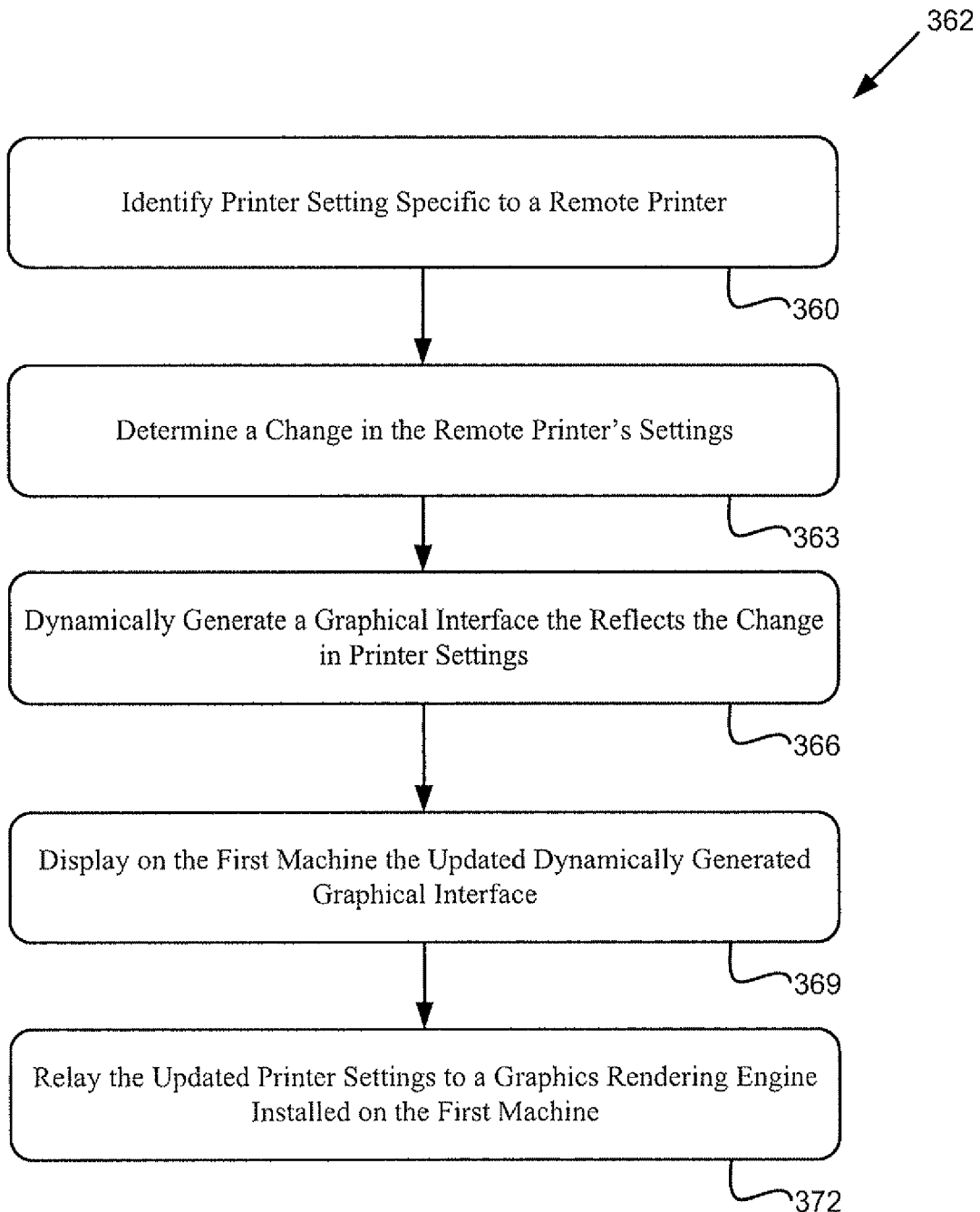
FIG. 7 is a flow diagram illustrating an embodiment of a method for responding to printer setting changes.

Illustrated in FIG. 7 is an embodiment of a method 362 that uses a virtual printer driver 220 to identify printer settings specific to a remote printer 205A-205B (step 362). The virtual printer driver 220, in many embodiments, determines whether or not the retrieved printer settings have changed (step 363). In one embodiment, the virtual printer driver 220 utilizes the changed printer settings to dynamically generate a graphical interface that reflects the change in printer settings (step 366). The virtual printer driver 220, in one embodiment, may display a graphical interface, created by the virtual printer driver 220, on the first machine (step 369). Transmission of the updated printer settings to a graphics rendering engine 232 on the first machine, may in most embodiments be accomplished using the virtual printer driver 220 (step 372). One embodiment of the method 362 can include dynamically updating an existing graphical interface displayed on the first machine to reflect the change in printer settings.

In an embodiment, the virtual printer driver 220 can respond to changes in printer setting information by first querying cache memory 140 for printer settings associated with the remote printer 205 connected to the second machine 102. Other embodiments include a virtual printer driver 220 that queries cache memory 227A-227B associated with the virtual printer queues 225A-225B. The virtual printer driver 220, in one embodiment, then reviews the query response and identifies the remote printer's settings (step 360). In an embodiment of the method 362, after the printer settings are identified, the virtual printer driver 220 reviews the first graphical interface to determine whether or not the printer settings associated with the remote printer have been altered (step 363). The virtual printer driver 220, in one embodiment, can dynamically generate an updated graphical interface reflective of changed printer settings (step 366). In one embodiment, the virtual printer driver 220 then takes the updated graphical interface and displays the interface on the display screen on the first machine (step 369). In one embodiment, the virtual printer driver 220 relays the updated printer settings to the graphics rendering engine 232 on the first machine 106 (step 372). The first machine can be any one of either the server 106 or the client machine 102A-102B, while the second machine can be any one of either the server 106 or the client machine 102A-102B.

The following illustrative example shows how the methods and systems discussed above may be used for managing printer settings in a networked computing environment. This example is meant to illustrate and not to limit the disclosure.

In some embodiments of the methods and systems described above, and referring to FIG. 3A, a first client 102A and a second client 102B access one or more applications running on server 106. In one embodiment, the first client 102A connects to the server 106. An application is launched on the server 106, the application being controlled by a user associated with client 102A.

In one embodiment, a virtual printer queue 225A is created on the server 106 by a virtual printer driver 220 and associated with the application executing on the server 106. The virtual printer queue 225A is also associated with a first plurality of printers 205A connected to the first client 102A. The virtual printer queue 225A may be created at the time of first remote access to the application from any client computer and persists as long as the application session does. In some embodiments, the virtual printer queue 225A persists even in the event that the first client 102A or the second client 102B become disconnected from the server 106.

In some embodiments, the virtual printer queue 225A is managed by the virtual printer driver 220. In one embodiment, the virtual printer driver 220 adjusts printer capabilities and preferences presented to the application executing on the server 106 from the virtual printer queue 225A based on active interrogation of printer capabilities and preferences of all printers connected to the first and second clients 102A-B. In one embodiment, the first and second clients 102A-B can be connected to the server 106 intermittently and for different periods of time.

In some embodiments, when the first client 102A is connected to the server 106, the virtual printer driver 220 configures the virtual printer queue 225A to associate it with the capabilities and preferences of a first printer 205A connected to the first client 102A. In one embodiment, the first printer 205A is a preferred printer for the user associated with the first client 102A. The virtual printer driver 220 that manages the virtual printer queue 225A, provides a user interface that can be displayed within a window of the application executing on the server 106. This user interface allows the user to select and modify print job settings that are within the capabilities of the first printer 205A associated with the virtual printer queue 225A. The virtual printer driver 220 achieves this by interrogating the first printer's 205A capabilities and preferences, and exchanging messages with a software agent executing on the first client 102A via a network 104 that connects the first client 102A and the server 106. After selecting one or more print job preferences that are consistent with the capabilities of the first printer 205A, the application can generate a print job which can be routed over the network 104 to the first client 102A. The print job is processed at the first client 102A and then forwarded to the first printer 205A to initiate printing.

In some embodiments, the user interface provided by the virtual printer driver 220 allows the user to select, modify, and print to other printers 205A' that may be connected to the first client 102A. When the user selects a second printer 205A' in the user interface, the virtual printer driver 220 reconfigures the virtual printer queue 225A to associate with the characteristics of the second printer 205A'. The user interface allows the user to select printing preferences consistent with the dynamically interrogated capabilities of the second printer 205A' and allows the application to generate a print job that is routed from the server 106 to the first client 102A where the print job is processed and forwarded to the second printer 205A'.

During the lifetime of the application executing on server 106, the first client 102A may become disconnected. This may result from a network disruption in the connection between the first client 102A and the server 106, or from an explicit user request to disconnect the first client 102A from the server 106. In one embodiment, if the network connection between the first client 102A and the server 106 is quickly re-established, the virtual printer driver 220 may continue to present the profile of the first printer 205A to the application executing on the server 106. In some embodiments, if the disconnection was explicitly requested or if the network disruption exceeds a configurable period, the virtual printer driver 220 may configure the profile of the virtual printer queue 225A to a preset state. In one embodiment, when network connectivity is restored and the first client 102A reconnects to the server 106, the virtual printer queue 225A may assume the profile of the user's default printer on the first client 102A.

During the lifetime of the application, a second client 102B may connect to the server 106 to access the application. The virtual printer driver 220 may reconfigure the virtual printer queue 220 to be associated with the capabilities and preferences of a third printer 205B connected to the second client 102B. In one embodiment, the third printer 205B is the user's default printing device for the second client 102B. The user interface presented by the virtual printer driver 220 for the virtual printer queue 225A may be used to retrieve printing preferences associated to the third printer 205B. A print job that may then be routed from the server 106 to the second client 102B, processed at the second client 102B, and forwarded to the third printer 205B. The user interface may also allow the user to select a fourth printer 205B' on the second client 102B, modify printing preferences and generate a print job that can be sent from the server 106 to the second client 102B, processed at the second client 102B, and forwarded to the fourth printer 205B'.

In one embodiment, the user may be re-associated with the second client 102B, remotely accessing the application from the second client 102B. The virtual printer queue 225A intercepts a third print request generated via the application from the second client 102B. In response to the interception of the third print request, the virtual printer driver 220 displays the user interface associated with the first printer 205A, and transmits the retrieved setting information associated with the first printer 205A to a graphics rendering engine on the first client 102A for display.

In some embodiments, if a user changes a printer associated with the virtual printer queue 225A by disconnecting a client associated with the user with the server 106, the system may restore this association on behalf of the user when a client associated with the user reconnects to the server 106. In other embodiments, the system may support a plurality of virtual printer queues each with its own default association with a preferred printer.

The systems and methods described above may be implemented as a method, apparatus or article of manufacture using programming and/or engineering techniques to produce software, firmware, hardware, or any combination thereof. The systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.), a file server providing access to the programs via a network transmission line, wireless transmission media, signals propagating through space, radio waves, infrared signals, etc. The article of manufacture can include hardware logic as well as software or programmable code embedded in a computer readable medium that is executed by a processor. In general, the computer-readable programs may be implemented in any programming language, LISP, PERL, C, C++, PROLOG, or any byte code language, such as JAVA. The software programs may be stored on or in one or more articles of manufacture as object code.

Having described certain embodiments of methods and systems for managing printer settings in a networked computing environment, it will become apparent to one of skill in the art that other embodiments incorporating the concepts of the described embodiments may be used. The embodied disclosure should not be limited to certain embodiments, but rather should be limited by the spirit and scope of the following claims.

What is claimed is:

1. A method for managing printer settings in a networked computing environment, the method comprising:
   executing, by a first machine in a networked computing environment, an application;
   intercepting, by a virtual printer queue managed by a virtual printer driver, a first print request generated via the application by a second machine in the networked computing environment;
   retrieving, by the virtual printer driver and in response to the interception of the first print request, setting information associated with a first remote printer, the first remote printer in communication with the second machine;
   displaying, by the virtual printer driver, a first graphical interface associated with the first remote printer, the first graphical interface dynamically generated by the virtual printer driver in response to retrieving the setting information;
   intercepting, by the virtual printer queue, a second print request generated via the application by a third machine in the networked computing environment;
   retrieving, by the virtual printer driver and in response to the interception of the second print request, setting information associated with a second remote printer, the second remote printer in communication with the third machine; and
   displaying, by the virtual printer driver, a second graphical interface associated with the second remote printer, the second graphical interface dynamically generated by the virtual printer driver in response to retrieving the setting information associated with the second remote printer.

2. The method of claim 1, further comprising:
   detecting, by the virtual printer driver, a change in at least one printer setting associated with the first remote printer;
   updating, by the virtual printer driver, the first graphical interface to display the changed printer setting;
   displaying, by the virtual printer driver, the updated first graphical interface; and
   associating, by the virtual printer driver, the virtual printer queue with the first remote printer.

3. The method of claim 1, further comprising:
   intercepting, by the virtual printer queue, a third print request generated via the application by the second machine;
   displaying, by the virtual printer driver, the first graphical interface associated with the first remote printer, the first graphical interface displayed by the virtual printer driver responsive to the interception of the third print request; and
   transmitting, by the virtual printer driver, the retrieved setting information associated with the first remote printer to a graphics rendering engine on the second machine.

4. The method of claim 1, further comprising:
   executing the virtual printer driver on a host machine in the networked computing environment;
   creating, by the virtual printer driver, the virtual printer queue according to retrieved printer setting information;
   using retrieved printer setting information to identify, by the virtual printer driver, a plurality of remote printers associated with a client machine in the networked computing environment, and
   associating, by the virtual printer driver, the virtual printer queue with the remote printer connected to the client machine.

5. The method of claim 4, wherein associating the first remote printer with the virtual printer queue further comprises mapping, by the virtual printer driver, a path to the first remote printer.

6. The method of claim 1, further comprising:
   interrogating, by the virtual printer driver, the first remote printer connected to the second machine;
   retrieving, by the virtual printer driver, printer setting information associated with the first remote printer, the printer setting information generated during interrogation of the first remote printer;
   creating, by the virtual printer driver, a first virtual printer queue associated with the first remote printer; and
   displaying, by the virtual printer driver, a first graphical interface associated with the first remote printer, the first graphical interface including the retrieved printer setting information associated with the first remote printer.

7. The method of claim 6, further comprising:
   transmitting, by the virtual printer driver, the retrieved setting information associated with the first remote printer to the graphics rendering engine on the second machine.

8. A method for managing printer settings in a networked computing environment, the method comprising:
   executing, by a first machine in a networked computing environment, an application;
   intercepting, by a virtual printer queue managed by a virtual printer driver, a first print request generated via the application by a second machine in the networked computing environment;
   retrieving, by the virtual printer driver and in response to the interception of the first print request, setting information associated with a first remote printer, the first remote printer in communication with the second machine;
   displaying, by the virtual printer driver, a first graphical interface associated with the first remote printer, the first graphical interface dynamically generated by the virtual printer driver in response to retrieving the setting information;

intercepting, by the virtual printer driver, an event disrupting access to the application from the second machine;
retrieving, by the virtual printer driver, printer setting information associated with the first remote printer; and
displaying, by the virtual printer driver, the first graphical interface associated with the first remote printer, the first graphical interface displayed by the virtual printer driver responsive to the retrieval of the setting information associated with the first remote printer.

9. The method of claim 8 wherein intercepting an event disrupting access to the application from the second machine further comprises intercepting a connection time-out between the second machine and the application.

10. The method of claim 8 wherein intercepting an event disrupting access to the application from the second machine further comprises intercepting a network disruption between the second machine and the application.

11. The method of claim 8 wherein intercepting an event disrupting access to the application from the second machine further comprises intercepting a user request to disconnect and reconnect the second machine to the application.

12. The method of claim 8 wherein intercepting an event disrupting access to the application from the second machine further comprises intercepting a second print request generated via the application by a third machine in the networked computing environment followed by a third print request generated via the application by the second machine.

13. A system for managing printer settings in a networked computing environment, comprising:
    a first machine, in a networked computing environment, executing an application;
    a virtual printer queue, executing on the first machine, for:
        intercepting a first print request generated via the application by a second machine, and
        intercepting a second print request generated via the application by a third machine; and
    a virtual printer driver, executing on the first machine, for:
        managing the virtual printer queue,
        retrieving from a first remote printer, connected to the second machine, setting information associated with the first remote printer, responsive to the interception of the first print request by the virtual printer queue,
        dynamically generating a first graphical interface associated with the first remote printer, responsive to the retrieved setting information associated with the first remote printer,
        displaying the first graphical interface associated with the first remote printer;
        retrieving from a second remote printer, connected to the third machine, setting information associated with the second remote printer, responsive to the interception of the second print request by the virtual printer queue,
        dynamically generating a second graphical interface associated with the second remote printer, responsive to the retrieved setting information associated with the second remote printer, and
        displaying the second graphical interface associated with the second remote printer.

14. The system of claim 13, wherein the virtual printer driver is further configured to:
    detect a change in at least one printer setting associated with the first remote printer;
    update the first graphical interface associated with the first remote printer to display the changed printer setting;
    display the updated first graphical interface associated with the first remote printer; and
    associate the virtual printer queue with the first remote printer.

15. The system of claim 13, wherein the virtual printer driver is further configured to:
    display the first graphical interface associated with the first remote printer, the first graphical interface displayed in response to the interception of a third print request by the virtual printer queue, the third print request generated via the application by the first machine; and
    transmit the retrieved setting information associated with the first remote printer to a graphics rendering engine on the first machine.

16. The system of claim 13, wherein the virtual printer driver is further configured to:
    create the virtual printer queue according to retrieved printer setting information associated with the first remote printer;
    identify a plurality of remote printers associated with a client computing device, based at least in part on the retrieved printer setting information associated with the first remote printer, and
    associate the virtual printer queue with the remote printer connected to the client computing device.

17. The system of claim 16, wherein the virtual printer driver for associating the first remote printer with the virtual printer queue is further configured to map a path from the virtual printer queue to the first remote printer.

18. The system of claim 13, wherein the virtual printer driver is further configured to:
    interrogate the first remote printer connected to the second machine;
    retrieve printer setting information associated with the first remote printer, the printer setting information generated during interrogation of the first remote printer;
    create a first virtual printer queue associated with the first remote printer; and
    display a first graphical interface associated with the first remote printer, the first graphical interface including the retrieved printer setting information.

19. The system of claim 18, wherein the virtual printer driver is further configured to:
    transmit the retrieved printer setting information associated with the first remote printer to the graphics rendering engine on the second machine.

20. A non-transitory computer readable medium having instructions thereon, that when executed provide a method for managing printer settings in a networked computing environment, the computer readable medium comprising:
    instructions to execute a virtual printer driver, the virtual printer driver configured in part to manage virtual printer queues;
    instructions to intercept, by a virtual printer queue, a first print request generated, via an application executing on a first machine in a networked computing environment, by a second machine;
    instructions to retrieve, by the virtual printer driver, from a first remote printer, setting information associated with the first remote printer, responsive to the interception of the first print request;
    instructions to display, by the virtual printer driver, a first graphical interface associated with the first remote printer, the first graphical interface dynamically generated by the virtual printer driver in response to the retrieved setting information;

instructions to intercept, by the virtual printer queue, a second print request generated via the application by a third machine;

instructions to retrieve, by the virtual printer driver, from a second remote printer, setting information associated with the second remote printer, in response to the interception of the second print request; and instructions to display, by the virtual printer driver, a second graphical interface associated with the second remote printer, the second graphical interface dynamically generated by the virtual printer driver in response to the retrieved setting information associated with the second remote printer.

21. The computer readable medium of claim 20, further comprising:

instructions to detect, by the virtual printer driver, a change in at least one printer setting associated with the first remote printer;

instructions to update, by the virtual printer driver, the first graphical interface to display the changed printer setting;

instructions to display, by the virtual printer driver, the updated first graphical interface; and instructions to associate the virtual printer queue with the first remote printer.

22. The computer readable medium of claim 20, further comprising:

instructions to intercept, by the virtual printer queue, a third print request generated via the application by the second machine;

instructions to display, by the virtual printer driver, the first graphical interface associated with the first remote printer queue, the first graphical interface displayed by the virtual printer driver responsive to the interception of the third print request; and instructions to transmit, by the virtual printer driver, the retrieved setting information associated with the first remote printer to a graphics rendering engine on the second machine.

23. The computer readable medium of claim 20, further comprising:

instructions to execute the virtual printer driver on a host machine in the networked computing environment;

instructions to create the virtual printer queue, by the virtual printer driver, according to the retrieved printer setting information associated with the first remote printer;

instructions to use the retrieved printer setting information associated with the first remote printer to identify, by the virtual printer driver, a plurality of remote printers associated with a client machine, and instructions to associate the virtual printer queue, by the virtual printer driver, with the first remote printer connected to the client machine.

24. The computer readable medium of claim 23, wherein instructions to associate the first remote printer with the virtual printer queue further comprises instructions to map, by the virtual printer driver, a path to the first remote printer.

25. The computer readable medium of claim 20, further comprising:

instructions to interrogate, by the virtual printer driver, the first remote printer connected to the second machine;

instructions to retrieve, by the virtual printer driver, printer setting information associated with the first remote printer, the printer setting information generated during interrogation of the first remote printer;

instructions to create, by the virtual printer driver, a first virtual printer queue associated with the first remote printer; and instructions to display, by the virtual printer driver, a first graphical interface associated with the first remote printer, the first graphical interface including the retrieved printer setting information associated with the first remote printer.

26. The computer readable medium of claim 20, further comprising:

instructions to transmit, by the virtual printer driver, the retrieved setting information associated with the first remote printer to a graphics rendering engine on the second machine.

* * * * *